United States Patent
Ming

(10) Patent No.: US 10,891,565 B2
(45) Date of Patent: Jan. 12, 2021

(54) WORKS TIMING

(71) Applicant: Tower Rock Technologies, LLC, Bakersfield, CA (US)

(72) Inventor: Garrett Russell Ming, Bakersfield, CA (US)

(73) Assignee: Tower Rock Technologies, LLC, Bakersfield, CA (US)

( * ) Notice: Subject to any disclaimer, the term of this patent is extended or adjusted under 35 U.S.C. 154(b) by 681 days.

(21) Appl. No.: 14/213,537

(22) Filed: Mar. 14, 2014

(65) Prior Publication Data

US 2015/0262114 A1 Sep. 17, 2015

(51) Int. Cl.
   *G06Q 10/06* (2012.01)
(52) U.S. Cl.
   CPC .......................... *G06Q 10/063114* (2013.01)
(58) Field of Classification Search
   None
   See application file for complete search history.

(56) References Cited

U.S. PATENT DOCUMENTS

| | | | |
|---|---|---|---|
| 2002/0007289 A1* | 1/2002 | Malin | G06Q 10/06 705/4 |
| 2002/0065702 A1* | 5/2002 | Caulfield | G06Q 10/04 705/7.15 |
| 2006/0111957 A1* | 5/2006 | Carmi | G06Q 10/063116 705/7.16 |
| 2007/0043487 A1* | 2/2007 | Krzystofczyk | G06Q 10/06 701/29.5 |
| 2014/0188999 A1* | 7/2014 | Leonard | H04L 12/1859 709/204 |

* cited by examiner

*Primary Examiner* — Rutao Wu
*Assistant Examiner* — Zahra Elkassabgi
(74) *Attorney, Agent, or Firm* — Newport IP, LLC; Jacob P. Rohwer

(57) ABSTRACT

The system and/or processes described herein are configured to help an entity operating one or more service facilities manage the timing of service jobs across work stations. The entity manages the timing based on receiving, and tracking, job status information received from the work stations. For instance, after receiving the job status information, the entity may implement timing mechanisms to estimate or predict a time when a service job is likely to begin. The entity may also use the timing mechanisms to estimate or predict a time when the service job is likely to be completed.

15 Claims, 18 Drawing Sheets

Time Remaining On Jobs In Shop — 602

| Time | Name | Vehicle | Tech |
|------|------|---------|------|
| 25:47 | LORI | 2012 Escape | Jim |
| 05:51 | BINNS | 2013 Explorer | Sally |
| 12:13 | STEVE | 2011 XTERRA | Sue |
| 33:51 | DEBBIE | 2013 F150 | Jeff |

Estimated Start Times — 604

| Name | Vehicle | Time |
|------|---------|------|
| STEPHANIE | 2012 CAMRY | 9:15 AM |
| TIM | 2010 IMPALA | 9:21 AM |
| RALPH | 2011 JETTA | 9:35 AM |

Next Available Start Time: 9:43 AM — 606

Jobs finished within 5 minutes of the estimated duration — 1600

| | Yesterday<br>Actual (%) | Last 5 Days<br>Daily Avg. (%) | Last 30 Days<br>Daily Avg. (%) |
|---|---|---|---|
| Works gas | 16 out of 26 (62%) | 20 out of 32 (63%) | 22.4 out of 29 (77%) |
| Works diesel | 3 out of 5 (60%) | 2.4 out of 3 (80%) | 2.2 out of 3 (73%) |
| Tires | 2 out of 2 (100%) | 2 out of 3 (66%) | 2.5 out of 3 (83%) |
| Other | 0 out of 1 (0%) | 0.6 out of 1 (60%) | 1.4 out of 2 (70%) |

FIG. 16

Jobs per day by work type

Group by: [Team] [Work Type]

| | Yesterday<br>Actual | Last 5 Days<br>Daily Avg. | Last 30 Days<br>Daily Avg. |
|---|---|---|---|
| Works Gas | 26 | 32 | 29 |
| Works Diesel | 5 | 3 | 3 |
| Tires | 2 | 3 | 3 |
| Other | 1 | 1 | 2 |
| All | 34 | 39 | 37 |

Est. Duration Time vs Actual Duration Time

| | | Yesterday Daily Avg | Last 5 Days Daily Avg | Last 30 Days Daily Avg |
|---|---|---|---|---|
| Works Gas | Est. Duration | 48.00 | 47.00 | 48.00 |
| | Act. Duration | 52.52 | 53.04 | 53.68 |
| | +/- | 4.52 | 6.04 | 5.68 |
| Works Diesel | Est. Duration | 58.00 | 66.00 | 66.00 |
| | Act. Duration | 60.22 | 66.60 | 72.66 |
| | +/- | 2.22 | 0.60 | 6.66 |
| Tires | Est. Duration | 88.00 | 68.00 | 64.00 |
| | Act. Duration | 89.01 | 74.42 | 73.40 |
| | +/- | -1.00 | 6.42 | 9.40 |
| Other | Est. Duration | 180.00 | 84.00 | 48.00 |
| | Act. Duration | 223.73 | 87.87 | 51.68 |

FIG. 18

WORKS TIMING

BACKGROUND

Today, customers visit many different facilities (e.g., automobile shops, hair salons, massage parlors, etc.) to service a variety of items belonging to the customers (e.g., change the oil of a customer's automobile, cut a customer's hair, massage a customer's back muscles, etc.). Typically, these facilities individually comprise multiple work stations equipped to service the items.

However, these facilities do not provide an effective way of managing and coordinating the work flow across multiple work stations. Specifically, customers that visit these facilities may often experience frustration at least because the facilities are unable to provide any transparency or visibility to the customer regarding accurate timing information related to a service job (e.g., work) to be performed on the customers' items. In other words, the facilities are unable to accurately estimate or predict timing information associated with a service job, and therefore, are unable to accurately inform customers of when a service job will most likely begin and/or when the service job will most likely be completed, for example.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIG. 6 illustrates an example graphical user interface directed to displaying timing information associated with service jobs and/or notifying customer of the timing information, as described herein in accordance with various embodiments.

FIG. 16 illustrates an example graphical user interface directed to displaying a number and percentage of jobs actually finished within a threshold period of time of an estimated duration, as described herein in accordance with various embodiments.

FIG. 17 illustrates an example graphical user interface directed to displaying a performance report that summarizes a number of actual completed jobs for a given period according to work type, as described herein in accordance with various embodiments.

FIG. 18 illustrates an example graphical user interface directed to displaying a performance report that determines differences between an estimated duration of time to complete jobs of a particular type and an actual duration of time to complete jobs of the particular type, as described herein in accordance with various embodiments.

DETAILED DESCRIPTION

Figure 1:
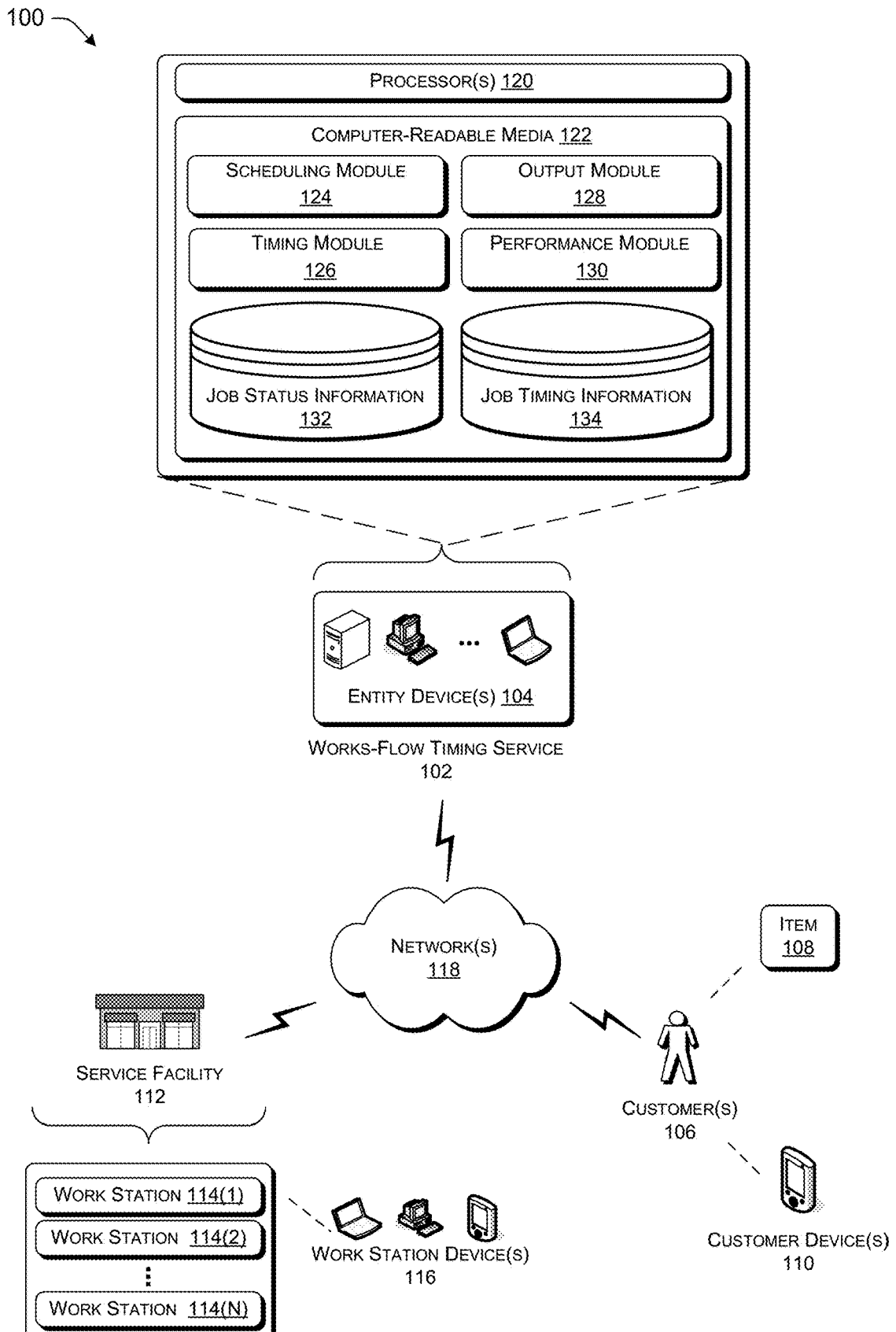
FIG. 1 is a diagram showing an example environment that implements a works-flow timing service to receive job status information and manage the work-flow timing of service jobs across work stations, as described herein in accordance with various embodiments.

The system and/or processes described herein are configured to help an entity operating one or more service facilities manage the timing of service jobs across work stations. The entity manages the timing based on receiving, and tracking, job status information received from the work stations. For instance, after receiving the job status information, the entity may implement timing mechanisms to estimate or predict a time when a service job is likely to begin. The time when a service job is likely to be begin may be referred to herein as an "estimated start time". The entity may also use the timing mechanisms to estimate or predict a time when the service job is likely to be completed. The time when the service job is likely to be completed may be referred to herein as an "estimated complete time". Accordingly, the estimated timing information may be based on tracked actual timing information from service jobs actually completed at work stations.

A service job ("job"), as used in this document, is associated with work to be performed on an item by a service facility or service center. The work may comprise a specific process to follow and/or an item maintenance checklist of one or more work items to conduct. For example, a service job may be an "oil change" job, the service facility may be an automobile maintenance service facility, and the work to be performed may comprise draining the old oil, changing an oil filter, and filling the oil reservoir of the automobile with new oil.

In various embodiments, the estimated start time of a service job, the estimated complete time of the service job, and/or an estimated duration of time that remains until the service job is completed (e.g., after the service job has started), may be communicated to a customer (e.g., via a Web page located via a URL, via a push notification such as an email, a text, a social network message/notification, etc.). Consequently, the entity provides transparency and visibility to the customer which improves the customer experience. That is, the customer may be informed of an accurate estimated start time and/or an accurate estimated complete time so that they can adapt and/or plan their personal schedule around the servicing of their item. For example, a representative of the service facility may use the techniques herein to inform the customer that an estimated next available start time for a service job is two hours away or ten minutes away. In the scenario where the estimated next available start time is two hours away, the customer may be more likely to not have an item serviced at that time and would rather come back another time (e.g., the next day or the next week). In the scenario where the next available start time is ten minutes away, the customer may be more likely to agree to have the item serviced at that time. In some instances, a customer may view the estimated next available start time on a Web page, via a network connection (e.g., the Internet), without having to physically visit or arrive at a service facility. The customer may then, in response to the viewing, be able to make an informed decision on whether or not to reserve the estimated next available start time to have their item serviced. The customer may reserve the estimated next available start time via the Web page or via a telephone call to the service facility. Once reserved, the service facility may expect the customer to show up with a serviceable item a pre-determined amount of time before the estimated next available start time communicated to the customer (e.g., at least five minutes before, at least ten minutes before, at least fifteen minutes before, etc.).

In some embodiments, the entity may use the job status information and the timing mechanisms to generate performance metrics. The performance metrics may be determined based on a comparison of estimated timing information for jobs (e.g., the timing information communicated to customers at a time a job work order is created) and actual timing information associated with the actual completion of the jobs. Moreover, the performance metrics may be generated for, and/or specific to, any one of an individual employee (e.g., a technician operating an individual work station), an individual service facility with multiple work stations, or multiple service facilities operated by the entity. The entity may use the performance metrics to evaluate individual employees, individual service facilities, and/or multiple service facilities over a given time period (e.g., an hour, two hours, four hours, a day, two days, one week, a month, etc.). The evaluation may be used to determine bonuses based on exceptional work, to set up a meeting with an employee that is struggling to perform to a certain standard, to identify an employee of the month, to determine time periods when an estimated wait is long (e.g., greater than thirty minutes, greater than an hour) and/or an estimated wait is short (e.g., less than thirty minutes, less than fifteen minutes), to make staffing decisions at a particular facility based on the estimated wait time (e.g., staff more people during a busy lunch hour, staff less people during a slow period in the afternoon), to identify busy time periods when a facility struggles to stay on schedule, to identify slow time periods when a facility is able to stay on schedule, etc. The entity may also use the performance metrics to compare and/or rank the performance of technicians, service facilities, and/or geographical regions (e.g., zip codes, cities, counties, states, etc.) in which the service facilities are located.

In various implementations discussed herein, the work associated with a service job is performed by one or more humans (e.g., a technician). In alternative implementations, the work may be performed by one or more machines (e.g., mechanical equipment, robots, etc.). In some instances, the work may be performed by both humans and machines (e.g., humans that instruct or operate the machines).

In at least one embodiment, the system and/or processes described herein may be implemented in an environment where customers physically visit a service facility or service center to have an item worked on. The customer may visit the service facility without a confirmed appointment or reservation made in advance. Moreover, the customers may often remain at the facility while their item is being serviced (e.g., the customer may sit in a waiting room while an automobile is being serviced, the customer may sit in a chair while hair is being styled, etc.). Such a service environment may be referred to as a "no appointment necessary" and/or "service while you wait" environment that commonly includes multiple work stations equipped to perform a variety of different types of service jobs. The service jobs performed in a "no appointment necessary" and/or "service while you wait" environment typically include repetitious work in which the process to perform a particular type of service job is the same, or at least similar, from one service job of the type to the next service job of the same type (e.g., an oil change on a first automobile typically involves the same or similar work process as an oil change on a second automobile). Put another way, technicians performing the work may not be required to diagnose or determine the cause of a problem with an item (e.g., an automobile making an odd noise). Rather, the technicians conduct the same process or checklist of maintenance items over and over and over again for service jobs of a particular type. Consequently, an amount of time it takes to complete a service job of a particular type most likely has little or no variation from one service job to the next.

In various implementations, the entities discussed herein may operate the facilities in accordance with rules and/or policies that do not allow customers to schedule or reserve a time slot for service or an appointment for service in advance. For example, the rules and/or policies may specify that a customer has to physically visit and arrive at a facility before a work order for a service job can officially be created and added to a list of queued service jobs waiting to be processed. In another example, the rules and/or policies may specify that the customer can call in or get online to reserve a time slot (e.g., the estimated next available start time) for service or an appointment for service in advance as long as the reservation is made within a threshold period of time of the reserved start time for the service job. In various implementations, this threshold period of time may be shorter (e.g., two hours before the service job is estimated or predicted to be started, four hours before the service job is estimated or predicted to be started, only the "day of" reservations, etc.) compared to service facilities (e.g., an auto repair shop) that allow customers to schedule appointments far in advance for a problem diagnosis and/or a major repair (e.g., two days in advance, a week in advance, a month in advance, etc.). As discussed above, in some implementations, a customer may reserve the estimated next available start time via an online reservation or via a telephone call reservation, and as part of the reservation, the customer may agree to physically arrive or be located at the service facility a pre-determined amount of time before the estimated next available start time (e.g., five minutes, ten minutes, fifteen minutes, etc.).

In various embodiments, the service facilities may be auto shops (e.g., quick maintenance auto shops) and the serviceable item may be automobiles. While at least some of the examples used herein are described with respect to auto shops equipped with various work stations to check and/or perform maintenance on automobiles, it is understood that the system and/or processes described herein may be implemented in other service environments and service facilities equipped with work stations to work on, and maintain, other items as well. For example, other embodiments of the service facilities may include shops that work on customer items such as boats, jet skis, motor cycles, bicycles, snow skis, etc. Moreover, even further embodiments of the service environment may include a hair salon (e.g., the item is a customer's hair), a massage parlor (e.g., the item is a customer's body or a portion of the body such as a back or neck), a beauty salon (e.g., the item is customer's face where makeup is applied), a nail salon (e.g., the item is a customer's finger nails or toe nails that receive a manicure or pedicure), etc. Thus, the serviceable item may be a detached item which the customer owns and/or possesses (e.g., an automobile, a bicycle, etc.). Or, the item may be part of, or attached to, the customer (e.g., hair, muscles, toe nails, finger nails, etc.).

In further embodiments, the techniques and/or systems discussed herein may perform a service job remotely (e.g., the customer may not have to physically bring the item to a service facility to have it worked on). For example, a technician may be operating a work station at a first location (e.g., a desk or cubicle located at a corporate office) and a customer and the customer's item may be at a second location (e.g., the customer's home address) while being worked on. The technician may communicate with the customer over a network connection or a phone line to service the customer's item and perform a service job of a particular type. For instance, the item may be a home computing device and the service job may be associated with fixing the computing device or installing/updating software on the computing device. Therefore, an entity that remotely services items may also determine timing estimates (e.g., an estimated start time, an estimated complete time, an estimated duration of time to complete a job of a particular type, an estimated next available start time, etc.) associated with service jobs.

The systems and/or processes described herein are implemented by a works-flow timing service configured to receive job status information from work stations and implement timing mechanisms based on the job status information. The job status information may include an indication that a service job has actually been started and/or an indication that the service job has actually been completed. Via use of the timing mechanisms, the works-flow timing service is able to provide and/or communicate, to the customers, an updated or real-time status of estimated timing information for service jobs currently being performed in an automobile shop or other service facility and for service jobs waiting to be performed.

In various embodiments, the works-flow timing service may also be able to determine an estimated start time for a next service job to be created (e.g., for the next customer). This may be referred to as the estimated next available start time discussed above. Consequently, customers are able to make an informed decision regarding the servicing of their item. For example, a customer may decide to have their automobile serviced on a different day due to a long estimated wait (e.g., greater than one hour). In another example, the customer may decide that there is enough time to leave a service facility (e.g., not sit in the waiting room at the auto shop) and return before the service job is supposed to be completed after being informed of an estimated complete time.

FIG. 1 illustrates an example environment 100 that implements the system and/or processes described herein. The environment 100 includes a works-flow timing service 102 implemented on one or more entity device(s) 104. The works-flow timing service 102 is configured to receive job status information and manage the timing of service jobs (i.e., track and manage the work-flow). The works-flow timing service 102 may be configured to determine timing information for jobs currently being performed or waiting to be performed based on the job status information and/or a type of job. The timing information may include an estimated start time, an estimated complete time, an estimated duration of time remaining until the job is completed (e.g., a live countdown for a job that has already started), and/or an estimated next available start time.

As discussed herein, an entity operating the entity device(s) 104, and the works-flow timing service 102, may be a company, a corporation, an enterprise, a government agency, an educational department, a non-profit organization or any other establishment configured to offer services to customers. Therefore, the environment 100 shows customer(s) 106, where each customer 106 is associated with a serviceable item 108. In some implementations, a customer 106 may also be associated with a customer device 110 configured to receive, and display to the customer, updates and/or notifications of timing information relating to the servicing of an item 108. For example, an update or notification may include an estimated start time, an estimated complete time, and/or an estimated duration of time remaining until a job that has already started is completed, etc. In this manner, the customer may be kept informed about when servicing of their item will most likely begin, when servicing of their item will most likely be completed, and/or their place in an order of jobs waiting to be started, etc.

To service an item 108 of a customer 106, the entity may operate one or more service facilities 112. Each service facility may include one or more work stations 114(1) . . . 114(N), wherein N is an integer number such as one, two, three, four, five, eight, ten, twenty, etc. As further discussed herein, a technician may be assigned to an individual work station, e.g., 114(1), to perform a service job on an item 108 of the customer 106. A technician, in the context of this document, may comprise an individual technician or multiple technicians (e.g., two or more technicians) that control an individual work station, e.g., 114(1). For example, the service job may be a job capable of being performed by one person (e.g., an oil change, styling of hair, a back massage, etc.). Or, the service job may be a job that, for any one of a variety reasons, the entity would like more than one technician to perform (e.g., the job requires multiple people, efficiency is improved if multiple people perform the job, etc.). Accordingly, a technician may include, but is not limited to, a mechanic, a repair man or woman, a hair stylist, a masseuse, a make-up artist, an equipment tuner (e.g., skis, bicycles, etc.) and so forth. In some service environments, a work station may also be referred to as a stall, a team or any other identifier or label that can separate one service unit from the next (e.g., work station 114(1) from work station 114(2)).

In some embodiments, a machine (e.g., a robot) may be the controller of a work station 114(1) . . . 114(N) instead of a technician. Or alternatively, the technician may work in conjunction with a machine (e.g., operate and/or instruct the machine) to perform the service job and work on the item 108.

In the course of a given operation period (e.g., a day, a week, etc.), the technician may continuously receive and process service jobs of a particular type or service jobs of a variety of types. Moreover, work stations 114(1) . . . 114(N) may be assigned one or more work station devices 116 configured to communicate, to the entity device(s) 104, information regarding the status of a job (referred to herein as "job status information"). For example, a technician may use a work station device 116 to communicate, e.g., to an entity device 104, that a service job has been drawn from a list of queued service jobs waiting to be started. The technician may use the work station device 116 to communicate, e.g., to an entity device 104, an indication of an actual start time for the job and/or an indication of an actual complete time for the job.

In various embodiments, a work station device 116 may be assigned to each of the work stations 114(1) . . . 114(N). In other embodiments, multiple work stations 114(1) . . . 114(N) may share a work station device 116. In some implementations, the technicians may communicate the job status information to the entity device(s) 104 independent of using a work station device 116, such as by physically walking from a first location of the work station 114(1) to a second location of the entity device 104 to verbally communicate the indications. A representative of the service facility 112 other than the technicians may then enter the job status information at an entity device 104. For example, the representative may be a manager, an advisor, a supervisor, a receptionist, a secretary a scheduler, etc.

Each of the devices (e.g., an entity device 104, a customer device 110, a work station device 116) in the environment 100 of FIG. 1 may be any one of a variety of devices including, for example, a desktop computer, a laptop computer, a tablet computer, a netbook computer, a smart phone, a portable digital assistant (PDA), a web-enabled mobile phone, a cellular phone, a gaming console, a set-top box, a multifunction communication device, a server, or any other electronic device capable of communicating or storing job status information and/or determining timing information for service jobs.

In various embodiments, the communication between the entity device(s) 104, the customer device(s) 106 and/or the work stations device(s) 116 may comprise network communications. Thus, the environment in FIG. 1 illustrates that the entity device(s) 104, the customer device(s) 106 and/or the work stations device(s) 116 may be connected by one or more network(s) 118. The one or more network(s) 118 may include, but are not limited to, one or a combination of a Local-Area Network (LAN), a Wide-Area Network (WAN), a Mobile Telephone Network MTN, bluetooth communications, radio frequency communications, or other communication technologies (e.g., wireless and/or wired). The one or more network(s) 118 may conduct communications while the devices (e.g., an entity device 104, a customer device 106 and/or a work stations device 116) are located at, or within, an individual service facility 112. Alternatively, the one or more network(s) 118 may conduct communications while one or more of the devices are at a location separate from a location of the service facility 112. For example, an entity device 104 may be located at corporate headquarters. In another example, a customer 106 may leave the service facility 112 to run errands after dropping off an item 108 for service and the customer 106 may want to receive timing updates or notifications via a customer device 110 while running the errands. In yet another example, a customer 106 may access a network location (e.g., a uniform resource locator for a Web page) associated with a service facility 112 to view the estimated next available start time for a service job and/or reserve the estimated next available start time.

Accordingly, the works-flow timing service 102 is configured to track and manage the timing information of service jobs across work stations 114(1) . . . 114(N) and/or inform customers of (i) a status of a job currently being performed at a work station 114(1) . . . 114(N), (ii) a status of a job in a queue waiting to be performed at a work station 114(1) . . . 114(N), and/or (iii) an estimated next available start time for a job for which a work order has not yet been generated.

In various embodiments, the timing information determined by the works-flow timing service 102 may also include an actual duration of time it takes to complete a job. The works-flow timing service 102 may use the actual duration of time to complete a job to determine (e.g., compute or calculate) job timing averages for a technician, for a service facility 112 or for multiple service facilities 112 operated by the entity. The job timing averages may be used by a manager, a supervisor or advisor to generate reports from which performance can be evaluated, as further discussed herein.

The environment 100 of FIG. 1 shows that an entity device 104 of the works-flow timing service 102 may include one or more processors 120 and computer-readable media 122. The computer-readable media 122 may include volatile and nonvolatile memory, removable and non-removable media implemented in any method or technology for storage of information, such as computer-readable instructions, data structures, program modules, or other data. Such memory includes, but is not limited to, random access memory ("RAM"), read-only memory ("ROM"), electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, redundant array of independent disks ("RAID") storage systems, or any other medium which can be used to store the desired information and which can be accessed by devices. The computer-readable media 122 may be implemented as computer-readable storage media ("CRSM"), which may be any available physical and non-transitory media accessible by the processor(s) 120 to execute instructions stored on the memory. In one implementation, CRSM may include RAM and Flash memory. In other implementations, CRSM may include, but is not limited to, ROM, EEPROM, or any other tangible medium which can be used to store the desired information and which can be accessed by the processor(s) 120.

The computer readable-media 122 may comprise a scheduling module 124, a timing module 126, an output module 128, and a performance module 130, each of which is further discussed herein. The computer-readable media 122 may also comprise a job status information database 132. The job status information database 132 may store job status information associated with jobs being performed at the work stations 114(1) . . . 114(N) and/or waiting jobs for which a work order has been generated. The computer-readable media 122 may also comprise a job timing information database 134 to store timing information associated with jobs. It is understood, in the context of this document, that one or more components (e.g., a module or a database) of the works-flow timing service 102 may also be implemented on a work station device 116 as well as an entity device 104. In some embodiments, the works-flow timing service 102 may be implemented as software as a service (SaaS) by the entity operating the service facility or another entity.

As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. In some instances, the functions and/or modules may be implemented as part of an operating system. In other instances, the functions and/or modules are implemented as part of a device driver, firmware, and so on.

In various embodiments, the scheduling module 124 is configured to receive the jobs status information from the work stations 114(1) . . . 114(N). The scheduling module 124 is also configured to receive instructions, via input received from a representative (e.g., a manager, an advisor, a receptionist, etc.) or a customer 106, to generate and to process a work order for a new job and add the new job to a queue of jobs waiting to be performed at one of the work stations 114(1) . . . 114(N). The scheduling module 124 may store the job status information in the job status information database 132 to be accessed at a later time. The job status information may indicate that a respective job is one of "waiting" to be performed, has "started" to be performed in response to receiving an indication of an actual start time from a work station device 116, or has been "completed" in response to receiving another indication of an actual complete time from a work station device 116. In some embodiments, the scheduling module 124 may also label a job as (i) "canceled" if the job has been canceled for some reason or (ii) "on hold" of servicing on the job is delayed for some reason. Thus, the scheduling module 124 is able to manage the work-flow of service jobs by maintaining the job status information.

In various embodiments, the timing module 126 determines (e.g., computes, calculates, accesses, obtains, etc.) and maintains timing information for jobs. In some instances, the timing module 126 determines the timing information based on the job status information received from the work stations 114(1) . . . 114(N) and/or stores the timing information in the job timing information database 134. The timing module 126 may also determine the timing information based on a number of jobs and types of jobs in a queue waiting to be performed. As further discussed herein, the timing information may include one or more of an estimated start time for a job, an estimated complete time for a job, an estimated duration of time that remains until completion of an already started job, and an estimated next available start time for a next job. The timing information may also include an actual duration of time to complete a job, which may be use to generate performance reports. As further discussed herein, the actual durations of time to complete jobs may be sorted and stored according to individual technicians, individual service facilities, and/or individual job types.

In various embodiments, the output module 128 is configured to cause the entity device(s) 104, the customer device(s) 110 and/or the work station device(s) 116 to output various graphical user interfaces (e.g., via a display screen, a monitor, a touch screen, etc.). The graphical user interfaces may display or provide the job status information and/or the timing information. In some implementations, the output module 128 is configured to output a graphical user interface on a display screen in a waiting room or lobby of a service facility 112 where a customer 106 may be waiting for the service of their item 108 to be completed and where the customer can view the timing information displayed. In some implementations, the output module 128 may communicate job status information and/or timing information to a customer device 110 so that it can be displayed at the customer device 110.

In various embodiments, the performance module 130 is configured to access the job timing information database 134 to generate one or more reports associated with performance metrics of an individual technician, an individual service facility 112, or multiple service facilities 112 that are operated by the entity. The performance module 120 may generate the reports based on a comparison of estimated timing information for jobs (e.g., the timing information communicated to customers at a time a job work order is created) and actual timing information associated with the actual completion of the jobs. For example, the performance module 130 may generate reports that provide: an average amount of time to complete jobs of a particular type during a given time period (e.g., a day, five days, a month, etc.), a number of jobs of a particular type actually completed during the given time period, a total number of jobs actually completed during the given time period, a number or percentage of jobs actually completed within a threshold period time (e.g., five minutes) after the estimated duration of time to complete a job of a particular type expires, a number or percentage of jobs actually started before or within a threshold period time of an estimated start time (e.g., the estimated start time communicated to a customer), a number or percentage of jobs completed before or within a threshold period of time of the estimated complete time (e.g., the estimated complete time communicated to a customer). It is contemplated that other reports may be generated by the performance module 130 as well.

The reports may be used by a manager, a supervisor or an advisor to evaluate, and/or compare, the performance of technicians, service facilities, geographical regions in which at least one service facility is located, etc. For example, the reports may be used by a manager or advisor to evaluate a technician's performance and/or timeliness with respect to processing and completing jobs (e.g., track improvement or track a learning curve of a new employee. The reports may also be generated to analyze work-flow for a given operation period (e.g., a day, a week). This analysis may provide visibility related to busy or slow times at a service facility 112 (e.g., lunch hour compared to late afternoon, a Saturday compared to a Wednesday, etc.). Moreover, the analysis may provide visibility related to an employee (e.g., the technician) that is performing above expectations (e.g., timely and efficient work) or an employee that is performing below expectations (e.g., slow and inefficient work).

Figure 2:
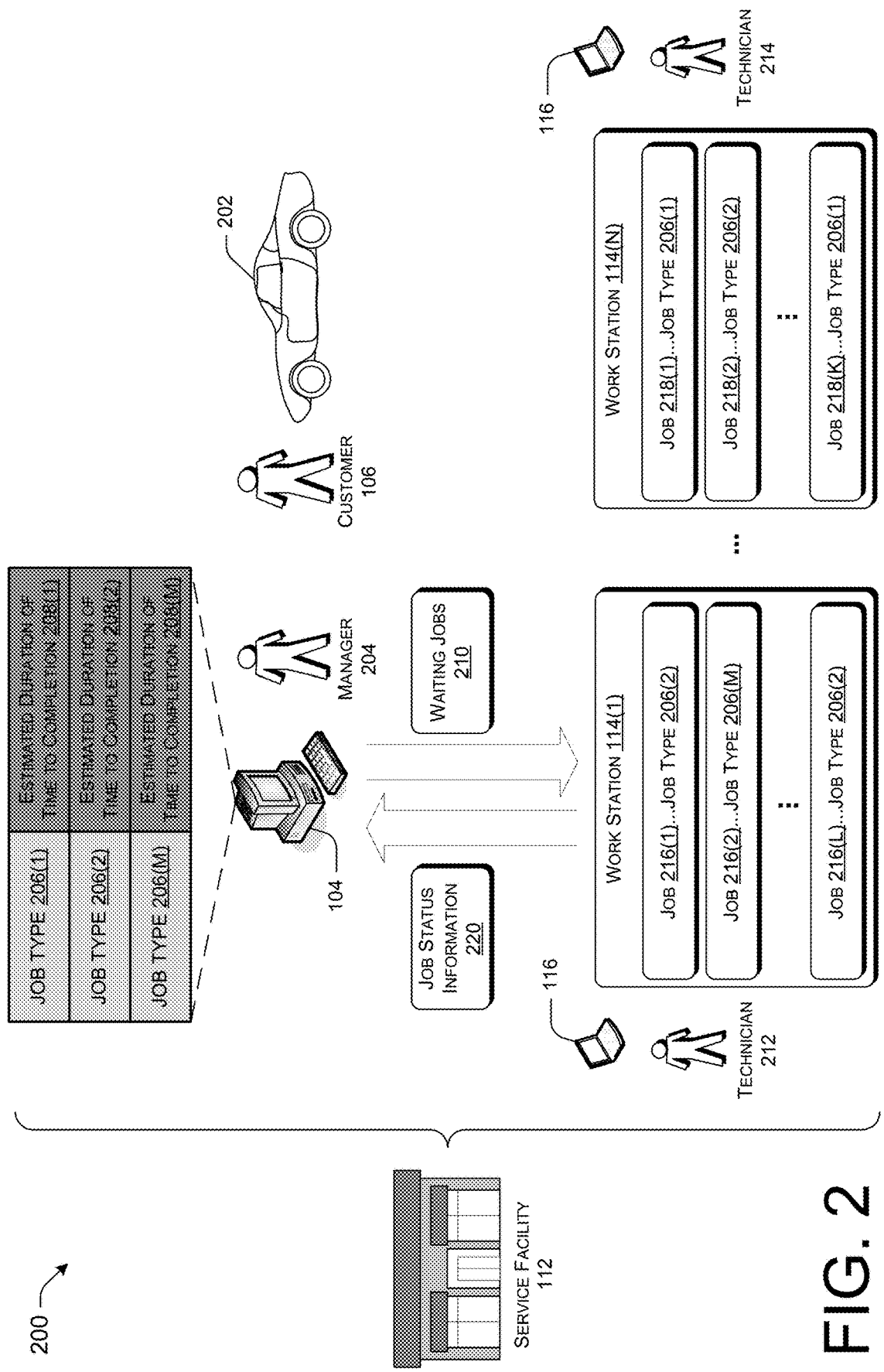
FIG. 2 is a diagram showing an individual service facility equipped with work stations to perform a variety of types of jobs, as described herein in accordance with various embodiments.

FIG. 2 illustrates an example diagram 200 that shows an individual service facility 112 equipped with work stations 114(1) . . . 114(N) to perform a variety of types of jobs. In FIG. 2, a customer 106 visits or arrives at a service facility 112 to have an item 108 (e.g., an automobile 202 in FIG. 2) serviced. In various embodiments, the customer 106 may physically visit the service facility 112 to schedule the service job with a service facility representative 204 (e.g., manager, advisor, receptionist, etc.) operating, or associated with, an entity device 104. In alternative embodiments, the customer 106 may use a customer device 110 to access and view information about the service facility 112 over the network(s) 118. For example, the customer 106 may use a customer device 110 to view the estimated next available start time for a job and/or reserve the estimated next available start time via the network(s) 118.

As shown in FIG. 2, the entity device 104 may store information defining various job types 206(1) . . . 206(M). Each job type 206(1) . . . 206(M) may be pre-defined or pre-set based on a known or repetitious work process or a pre-configured checklist of maintenance duties to be performed on an item (e.g., non-diagnostic work). Thus, each job type 206(1) . . . 206(M) is associated with an estimated duration of time to completion 208(1) . . . 208(M). The number M may represent a whole number such as one, two, three, six, eight, ten, twenty-five and so forth. An estimated duration of time to completion (e.g., 208(1)) may be the average duration of time it takes one or more technicians in the service facility 112, or across multiple service facilities, to complete jobs of a particular job type (e.g., previously completed jobs of job type 206(1)). The job types 206(1) . . . 206(M) and their respective estimated durations of time to completion 208(1) . . . 208(M) may be stored in the job timing information database 134.

In some embodiments, the estimated durations of time to completion 208(1) . . . 208(M) may be iteratively determined (e.g., calculated) in accordance with an update schedule (e.g., periodically updated, in response to an update event, etc.). For example, the estimated durations of time to completion 208(1) . . . 208(M) may be calculated by the timing module 126 based on averaging all the actual durations of time it takes to complete previous jobs of a particular type in a given time period (e.g., the last five days, the last thirty days, etc.). Moreover, the averaging may be based on the jobs of the particular type completed at an individual work station 114(1), an individual service facility 112, or multiple service facilities operated by an entity (e.g., all the service facilities).

For example, if a first technician actually completed two jobs of job type 206(1) in 44:15 (i.e., forty-four minutes and fifteen seconds) and 46:08 yesterday and a second technician actually completed two jobs of the job type 206(1) in 43:27 and 45:06 yesterday, the timing module 126 may calculate the estimated duration of time to completion 208(1) to be (44:15+46:08+43:27+45:06)/4=44:44, or forty-four minutes and forty-four seconds. However, it is contemplated that, in many instances, the estimated durations of time to completion 208(1) . . . 208(M) may be calculated based on a larger sample (e.g., more than four actual durations).

As discussed above, in a "no appointment necessary" and "service while you wait" environment, each job type 206(1) . . . 206(M) is typically associated with repetitious work in which the process to perform a particular job type (e.g., 206(1)) is the same, or at least similar, from one job to the next job. Since the work is typically repetitious for jobs of the same type, the amount of time it takes to perform jobs of the same type likely has little, or possibly no, variation from one job to the next (e.g., less than five minute difference, less than ten minute difference, etc.). Consequently, the works-flow timing service 102 discussed herein is able to determine accurate estimates of timing information associated with a job (e.g., an estimated start time, an estimated complete time, an estimated duration of time remaining, an estimated next available start time, etc.) and communicate the estimates to customers 106 to improve the customer experience. In contrast, the amount of time it takes to perform jobs in a service environment that performs major repairs on automobiles typically varies significantly from one job to the next as a result of needing to perform a diagnosis to identify the cause of the problem and make repairs accordingly.

In the example diagram 200 of FIG. 2, the service facility 112 may be an automobile maintenance shop. In an automobile maintenance shop, a first example job type (e.g., job type 206(1)) may include a "works gas" job type that performs a check-list of maintenance items on a gas automobile. For instance, the works gas may include (i) an oil change, (ii) an oil filter change, (iii) a tire rotation, and (iv) a multi-point inspection involving checking the fluids, belts, hoses, air filter, tire pressure, shocks, exhaust, battery, any fluid leaks, transmission and/or drive-train, steering components, and the brakes for any problems and/or damage. The timing information module 126 may have determined or calculated that, e.g., on average, it takes forty-five minutes to complete a job of the works gas type, and therefore, the estimated duration of time to completion 208(1) for the works gas job type may be forty-five minutes, for example. A second example job type (e.g., job type 206(2)) may include a "works diesel" job type that performs a check-list of maintenance items on a diesel automobile (e.g., the same, similar or different to the check-list discussed above for the "works gas" job type). The timing information module 126 may have determined or calculated that, on average, it takes sixty minutes to complete a job of the works diesel type, and therefore, the estimated amount of time to completion 208(2) for the works diesel job type may be sixty minutes, for example. The difference in estimated durations between a works gas type and a works diesel type may result from inherent differences between a gas automobile and a diesel automobile that effect the amount of time it takes to perform maintenance. A third example job type (e.g., job type 206(M)) may include a "tires" job type that changes the tires. The timing information module 126 may have determined or calculated that, e.g., on average, it takes seventy minutes to complete a job of the tires job type, and therefore, the estimated amount of time to completion 208(M) for the tires job type may be seventy minutes, for example. The estimated durations provided above are examples only, and thus, may be different in real-world scenarios.

It is understood that the techniques and/or systems discussed herein may be implemented in a service facility that services other items as well. For example, in a hair salon where an item 108 is the hair of a customer 106, the job types 206(1) . . . 206(M) associated with known and/or repetitious work from one job to the next may include one or more of a male hair cut, a female hair cut, a female hair style, a hair coloring, a hair perm, etc. In another example, in a massage parlor where an item 108 is the body of a customer 106, the job types 206(1) . . . 206(M) with known and/or repetitious work from one job to the next may include one or more of a full body massage, a neck massage, a back massage, a foot massage, a leg massage, etc.

Moving on, the representative 204, using the entity device 104, may receive information from the customer 106 and interact with the scheduling module 124 to write-up and create a work order that defines a job to be added to queue of jobs waiting to be performed (e.g., waiting jobs 210). The waiting jobs 210 may be listed in a "first-in-first-out" queue so that they are processed in an order according to when the customers 106 agreed to have an item serviced at the service facility 112.

The scheduling module 124 may then provide, or communicate, the waiting jobs 210 to the work stations 114(1) . . . 114(N). In various embodiments, technicians 212 and 214 at the work stations 114(1) and 114(N), respectively, may draw, e.g., via separate work station device 116 or the same work station device 116, a waiting job 210 upon actual completion of a previous job being processed. Therefore, through a given operation period (e.g., a day, a week, etc.), a work station and/or a technician may actually complete a number of jobs of a particular job type and/or a number of jobs of multiple job types 206(1) . . . 206(M).

As shown in FIG. 2, the technician 212 operating a first work station 114(1) completes jobs 216(1) . . . 216(L), where each job is of a particular, pre-defined job type discussed above. The number L may represent a whole number such as one, two, three, four, eight, ten, twenty, forty and so forth. Moreover, the technician 214 operating the Nth work station 114(N) completes jobs 218(1) . . . 218(K), where each job is also of a particular, pre-defined job type discussed above. The number K may represent a whole number such as one, two, three, four, eight, ten, twenty, forty and so forth. The number L and the number K may be the same, but most likely will be different because of the different technicians 212 and 214 and different types of jobs performed at the separate work stations 114(1) and 114(N).

In various embodiments, the work stations 114(1) . . . 114(N), e.g., via the work station devices 116, communicate job status information 220 to the entity device 104 to be stored in the job status information database 132. As further discussed herein, the job status information 220 may comprise (i) an indication that a job (e.g., a waiting job 210) has been drawn by a technician (e.g., 212 or 214), (ii) an indication of an actual start time for the drawn job, and/or (iii) an indication of an actual end time for the already started job.

The discussion herein provides example processes and example graphical user interfaces to further describe the techniques and/or systems. The example processes described are each illustrated as a logical flow graph, each operation of which may represent a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 3:
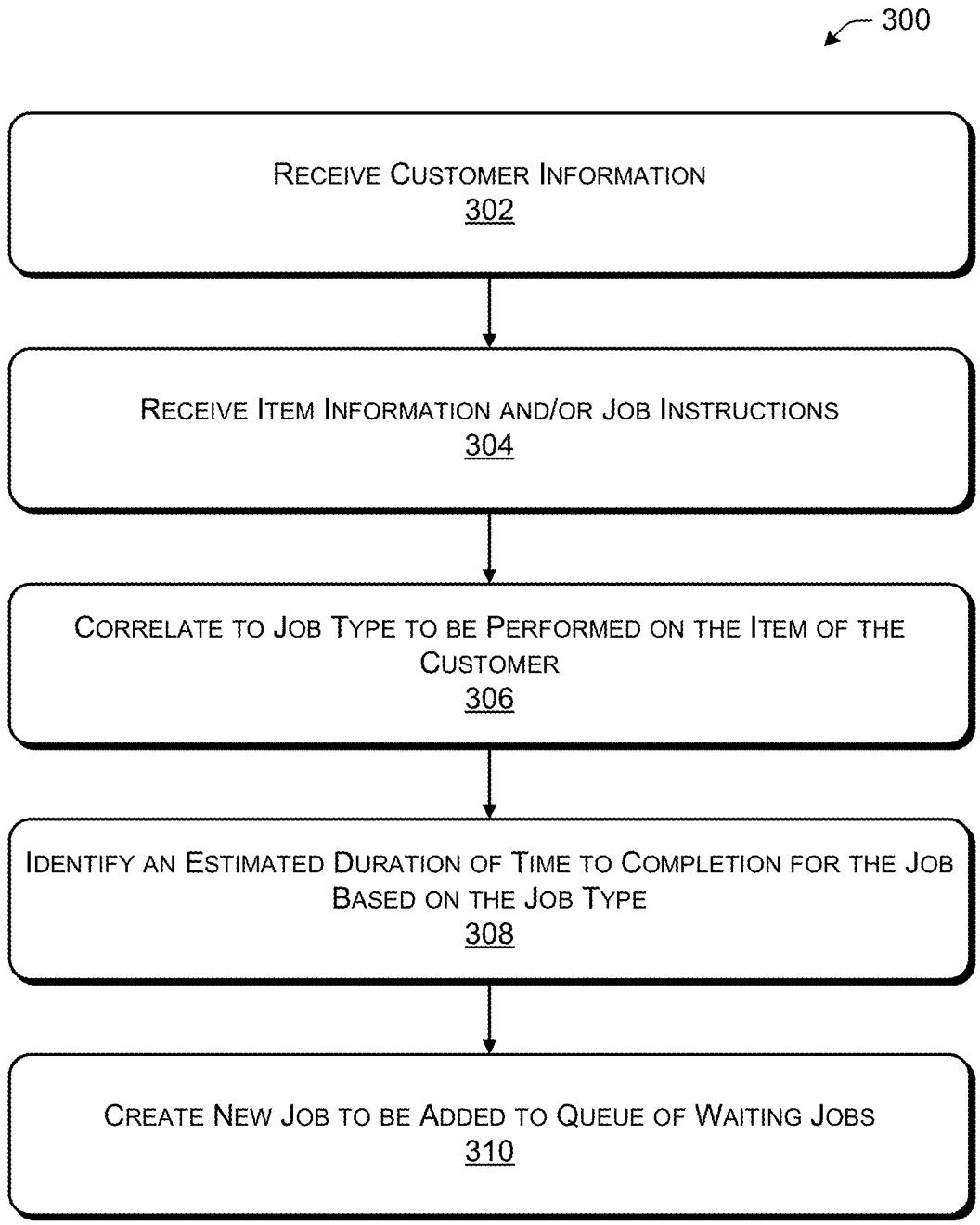
FIG. 3 is a flow diagram showing an example process that creates a new service job for a customer, as described herein in accordance with various embodiments.

FIG. 3 describes an example process 300 that creates a new service job for a customer. In various embodiments, individual operations described with respect to FIG. 3 may be performed by various ones of the devices discussed with respect to FIGS. 1 and 2.

At 302, the scheduling module 124 may receive customer information. The customer information may include identification (e.g., a first and/or last name), a phone number, an address and so forth. The customer information may be verbally communicated from the customer 106 to the representative 204 and then entered by the representative 204 at the entity device 104. Or, the customer information may be entered by the customer 106 via a customer device 110 or another device (e.g., a walk-up kiosk located at the service facility 112) and communicated to the scheduling module 124 of the entity device 104 via network(s) 118. In some instances, the customer information may be previously stored and recalled for a repeat customer.

At 304, the scheduling module 124 receives item information and/or job instructions. For example, the item information may include item specifics, such as a year of manufacture of an item, an identification of a company that makes an item, a model or version number of an item, and/or a color of an item (e.g., a blue 2008 Toyota Camry, a white 2012 Ford F250 pick-up). The item information may be used to distinguish one item 108 from another (e.g., identify an automobile 202). The job instructions may be received from the customer, or communicated by the customer, and may comprise an explanation that describes a problem with an item 108 or work the customer desires to be performed on the item 108. Similar to the discussion in the preceding paragraph, the item information and/or the job instructions may be verbally communicated from the customer 106 to the representative 204 and then entered by the representative 204 at the entity device 104. Or, the item information and/or the job instructions may be entered by the customer 106 via a customer device 110 or another device and communicated to the scheduling module 124 of the entity device 104 via network(s) 118.

At 306, the scheduling module 124 correlates the item information and/or the job instructions to a pre-defined job type (e.g., one of 206(1) . . . 206(M)) to be performed on the item 108. For example, if the item information comprises a Toyota Camry and the job instructions are associated with performing the "works" discussed above, then the scheduling module 124 may determine the job type to likely be that of a "works gas" job type (e.g., because a Toyota Camry most likely is a gas automobile). In another example, if the item information comprises a Ford F250 and the job instructions are associated with performing the "works" discussed above, then the scheduling module 124 may determine the job type to be that of a "works diesel" job type if the Ford F250 is a diesel pick-up. If the Ford F250 is a gas pick-up, the job type may be that of a "works gas" job type. In yet another example, if the job instructions are to perform a tire mount and balance (e.g., for four tires), then the scheduling module 124 may determine the job type to likely be that of a "tires" job type regardless of the make and model of a car. Accordingly, the pre-defined job type to be performed on an item may be determined based on, or in consideration of, the item information (e.g., diesel or gas) and/or the explicit job instructions of the customer 106.

At 308, the scheduling module 124 identifies, based on a job type to be performed (e.g., one of 206(1) . . . 206(M)), an estimated duration of time to completion (e.g., one of 208(1) . . . 208(M)). The estimated duration of time to completion for a started job being processed at one of the work stations 114(1) . . . 114(N) or for a waiting job 210 is used by the timing module 126 to determine the timing information. In some instances, the estimated duration of time to completion can be communicated to the customer 106 (e.g., the representative tells the customer that the service job is likely to take forty-five minutes). In various embodiments, the estimated duration of time to completion may further be based on more specific item information. For example, within a gas automobile category, an estimated duration of time to completion may depend on a size of the automobile, a make and model of an automobile and/or a year of manufacture.

At 310, the scheduling module 124 creates, e.g., based on an agreement from the customer 106 to have an item serviced, a new job to be added to a queue of waiting jobs 210 to be drawn by, or assigned to, a work station 114(1) . . . 114(N). For example, after receiving the information discussed above, the representative 204 may confirm a work order and the information discussed above (e.g., item information, job instructions, customer information, job type, estimated duration of time to completion) may be stored in association with the work order in the job status information database 132 with a label or status of "waiting". In some instances, if a work station is available to start the job, the newly created job may be immediately started at a work station without being added to the queue of waiting jobs 210, and thus, the work order may be stored in the job status information database 132 with a label or status of "started".

In various embodiments, a representative 204 or an entity device 104 may communicate timing information to the customer 106 for consideration before the customer 106 agrees, or decides, to have the item serviced at the service facility 112. The timing information may include an estimated next available time slot associated with an estimated start time. The timing information may also include an estimated complete time based on an estimated start time and an estimated duration of time to completion (e.g., if estimated start time is 9:15 AM and estimated duration of time to completion is thirty minutes, then the estimated complete time would be 9:45 AM).

The service facility 112 may repeat the example process 300 for each customer 106 that instructs the service facility 112 to service an item 108.

Figure 4:
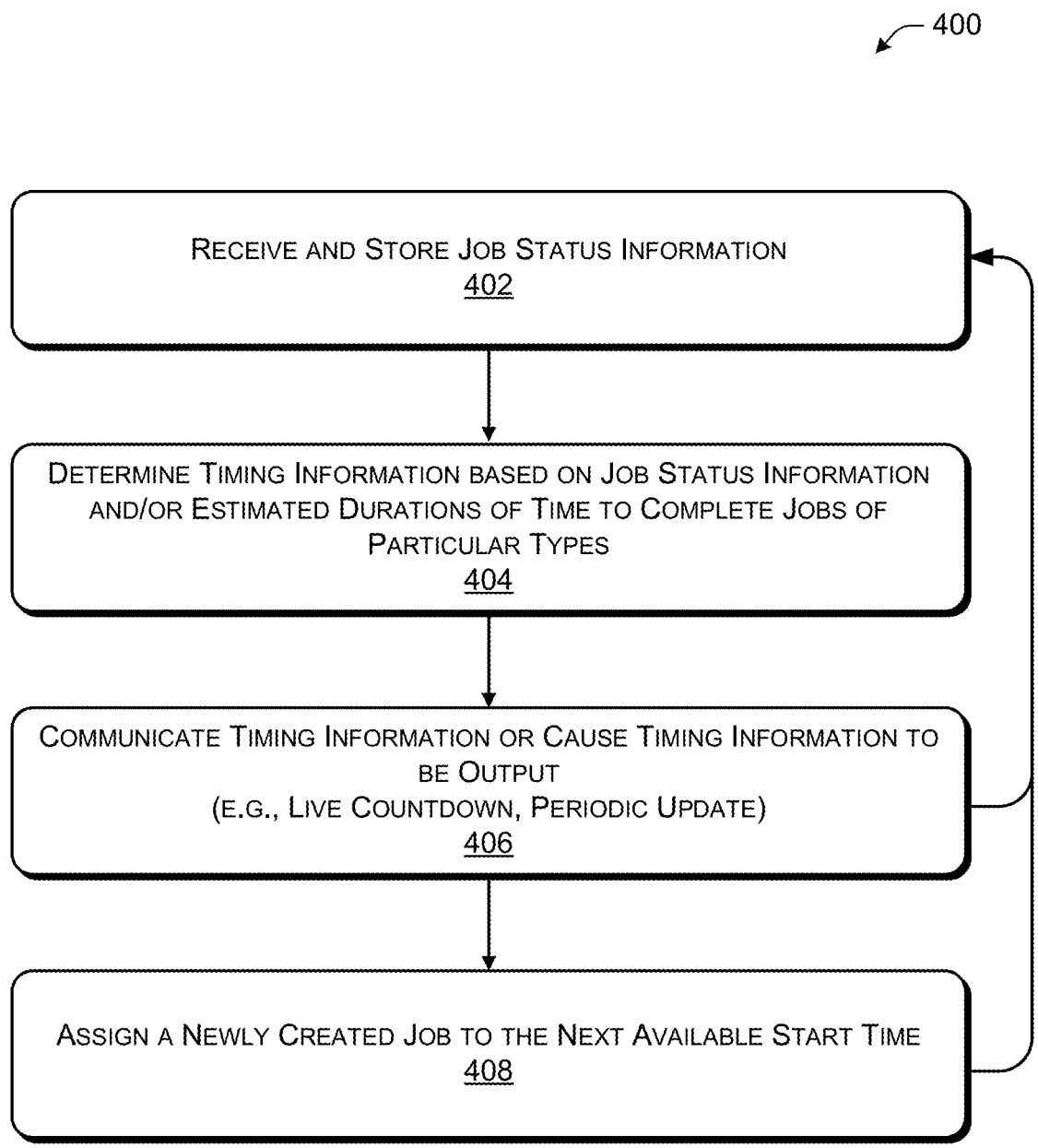
FIG. 4 is a flow diagram showing an example process that communicates to customers, or that informs the customers of, timing information related to the servicing of their items, as described herein in accordance with various embodiments.

FIG. 4 describes an example process 400 that communicates to customers, or that informs the customers of, timing information related to the servicing of their items (e.g., real-time, live timing information about a service job). In various embodiments, individual operations described with respect to FIG. 4 may be performed by various ones of the devices discussed with respect to FIGS. 1 and 2.

At 402, the works-flow timing service 102 receives job status information and stores it in the job status information database 132. For example, the scheduling module 124 may have generated a number of work orders for service jobs and added the service jobs to a queue of waiting jobs 210 (e.g., a "waiting" status). In another example, the scheduling module 126 may receive indications from the work stations 114(1) . . . 114(N) and store job status information based on the indications received. For example, an indication may convey that a waiting job has been drawn by a work station (e.g., a "drawn" or "preparing" status), an indication may convey that a waiting or drawn job has actually been started (e.g., a "started" status), or an indication may convey that a started job has actually been completed (e.g., a "completed" status). Accordingly, the job status information database 132 may store a list of service jobs and their respective associated statuses.

At 404, the works-flow timing service 102 determines timing information for the jobs based on the job status information and/or the estimated durations of time to complete jobs of particular types. For example, the timing information may include, but is not limited to, an estimated next available start time, an estimated start time for a waiting job, an estimated complete time for a started job or for a waiting job, and/or an estimated duration of time remaining until a job that has already started is completed. The timing information may be determined by the timing module 126, which is configured to calculate the timing information based on a number of active work stations equipped to perform the jobs, a number of waiting jobs, a number of started jobs and the time remaining, and the estimated durations of time to complete jobs of a particular type (e.g., 208(1) . . . 208(M)) that are associated with the waiting jobs, as further discussed herein with respect to the example graphical user interface of FIG. 6. The calculated timing information may then be stored in the job timing information database 134. Moreover, the timing information may also be determined by other modules or components of the works-flow timing service 102 (e.g., the scheduling module 124, the output module 128 and/or the performance module 130), which individually may access the timing information after the timing information has been calculated by the timing module 126 and stored in the job timing information database 134.

At 406, the output module 128 may communicate the timing information or cause the timing information to be output (e.g., displayed on a device). For example, the output module 128 may send some or all of the timing information to a customer device 110. In another example, the output module 128 may cause some or all of the timing information to be displayed via a display screen in a waiting room at the service facility.

Operation 402, 404 and/or 406 may be repeated such that accurate timing information can continually be determined and provided to customers 106 that visit the service facility 112 to have their items services and/or to customers 106 that desire to view the timing information over network(s) 118. Moreover, the timing information may be provided internally to employees of the service facility 112 as well.

In various embodiments, at 408, the scheduling module 124 may assign a newly created job (e.g., from operation 310) to an estimated next available start time. For example, a representative 204 may confirm that a customer 106 ha agreed to have an item services. In another example, the customer 106 may reserve the next available start time to have an item serviced by entering information online (e.g., customer information and item information) and confirming a service job via the network(s). The operations of FIG. 4 may be repeated again.

This disclosure contains discussion corresponding to various example user interfaces. An example graphical user interface may include numbers (e.g., a number of completed service jobs, calculated performance numbers, etc.). The numbers displayed are example numbers only, and may vary based on the service environment (e.g., auto maintenance shop, massage parlor, hair salon, etc.). In some instances, the numbers may not be real-world, practical numbers.

Figure 5:
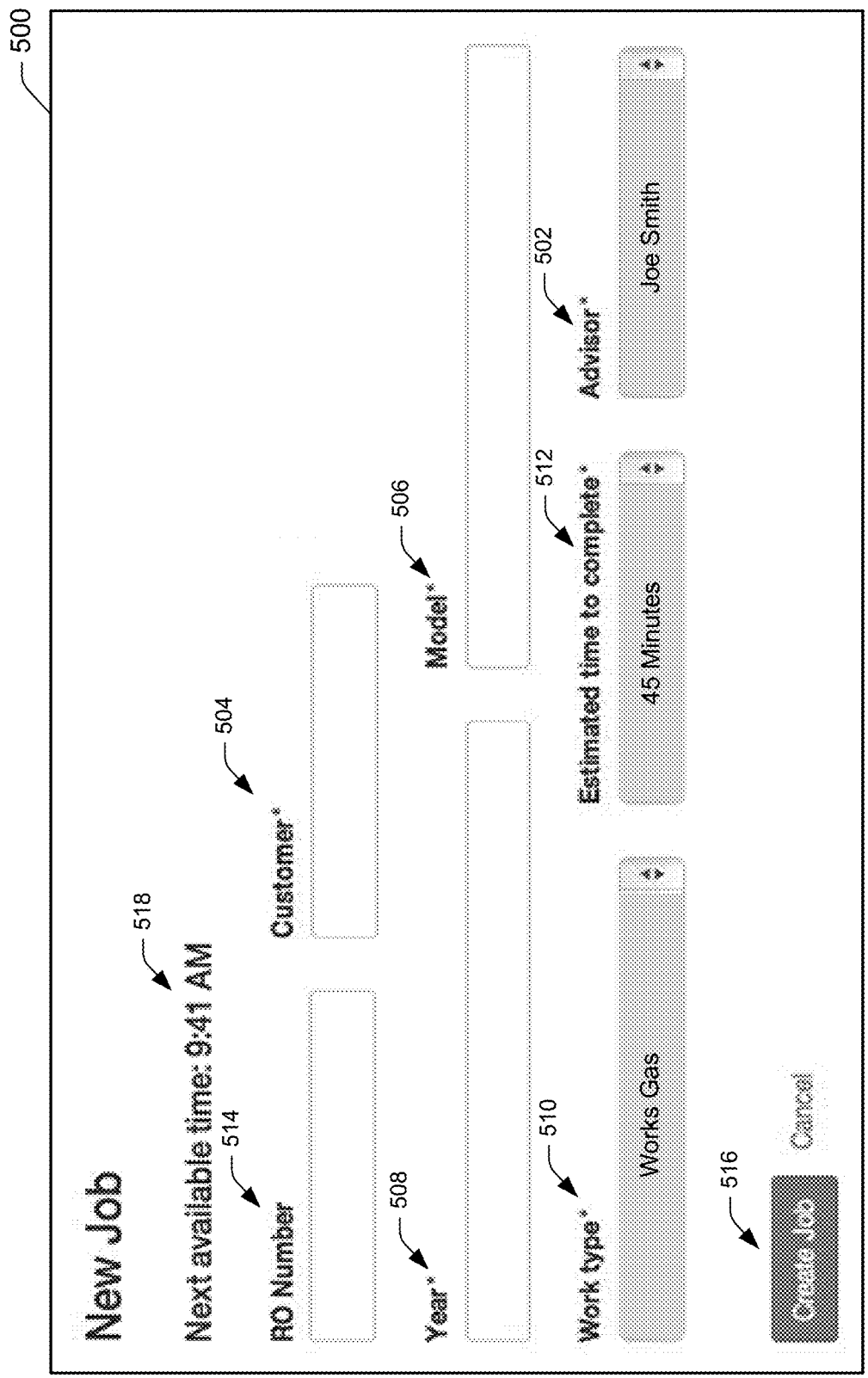
FIG. 5 illustrates an example graphical user interface directed to creating a new job and/or generating a work order, as described herein in accordance with various embodiments.

FIG. 5 illustrates an example graphical user interface (GUI) 500 directed to creating a new job or generating a work order. The example GUI 500 displays entry windows where information about the customer 106 and/or the item 108 to be serviced can be entered (e.g., by representative 204 or customer 110) so a new job can be created (e.g., as discussed above with respect to FIG. 3). For example, the example GUI 500 displays an entry window 502 that identifies the representative 204 entering the information (referred to as an advisor "Joe Smith", in this example), an entry window 504 that identifies the customer (e.g., a first and last name), an entry window 506 in which item information such as a model of an automobile can be entered, an entry window 508 in which other item information such as a year of manufacture of the automobile can be entered. It is understood that other item information and customer information may be entered as well.

The example GUI 500 further displays an entry window 510 for a job type (also referred to as a "work type") where a selection of one of multiple pre-defined job types 206(1) ... 206(M) can be made. The selection may be made by the person entering the information (e.g., representative 204), e.g., via a drop-down menu and based on explicit job instructions received from the customer 106. In some embodiments, the selection may be an automatic selection based on the item information (e.g., a gas works job type is automatically selected for a gas automobile). Entry window 512 displays the estimated duration of time to complete the job of the particular job type selected via entry window 510 (e.g., one of estimated durations of time to completion 208(1) ... 208(M)). In various embodiments, the advisor "Joe Smith" may modify the duration of time in window 512 based on various considerations.

The example GUI 500 also displays an entry window 514 for a work order identifier (e.g., a repair order (RO) number). This identifier or number may be manually input or automatically populated (e.g., sequential numbering), and is used by the works-flow timing service 102 to identify and process individual jobs. Once the information is entered and/or agreement from the customer is received, the new job can be created via the "create job" option 516.

Finally, the example GUI 500 displays the estimated next available start time 518. Accordingly, a representative 204 providing input to the entry windows of the example GUI 500 can conveniently and efficiently see the estimated next available start time (e.g., 9:41 AM) and verbally communicate the estimated next available start time 518 and/or the estimated end time (e.g., 9:41 AM plus 45 minutes, or 10:26 AM) to the customer 106 to improve the customer experience. In some implementations, the customer may view the next available start time 518 on his or her own customer device 110 before making a decision on whether or not to reserve the next available start time 518 to have an item serviced.

Accordingly, a person such as the representative 204 or customer 106 may be able to enter text in the separate entry windows, or an entry window may be configured as drop-down menu from which particular selections can be made (e.g., a job type selection).

FIG. 6 illustrates an example GUI 600 directed to displaying the timing information determined by the timing module 126. The example GUI 600 includes a first portion 602 showing timing information for "started" jobs currently being performed in the service facility (e.g., the "shop") and a second portion 604 showing timing information for jobs "waiting" to be performed that may reside in the queue of waiting jobs 210. The timing information displayed in the example GUI 600 may be based on a number of active work stations equipped to perform the jobs (e.g., four in the example of FIG. 6), a number of waiting jobs (e.g., three in the example of FIG. 6), a number of started jobs and the time remaining for each started job, and the estimated durations of time to complete jobs of a particular type (e.g., 208(1) ... 208(M)). The example GUI 600 may be displayed on a display screen in a waiting room at the service facility 112 and/or may be accessible by customer devices 110 via network(s) 118.

The first portion 602 may provide, e.g., to customers 106, real-time and live information associated with the timing of the work currently being performed on their items (e.g., for "started" jobs). As shown in the first portion 602 of example GUI 600, an estimated duration of time remaining until the job is expected or supposed to be completed is displayed to a customer (e.g., a timer countdown). Alternatively or additionally, the estimated complete time may be shown (e.g., if twenty minutes remain on a job and the current time is 9:40 AM then the estimated complete time would be 10:00 AM).

The estimated duration of time remaining until the job is expected or supposed to be completed may be based on an indication of an actual start time and an estimated duration of time to completion (e.g., one of 208(1) ... 208(M)) for a particular job type (e.g., one of 206(1) ... 206(M)). For example, if a job was actually started at 9:30 AM, the estimated duration of time to completion for the job is forty-five minutes, and the current time is 9:40 AM, then the estimated duration of time remaining until the job is supposed to be completed would be determined by the timing module 127 to be thirty-five minutes.

As seen in the first portion 602 of the example GUI 600, (i) a technician named "Jim" is working on a 2012 "Escape" of a customer named "Lori" and 25:47 (i.e., twenty-five minutes and forty-seven seconds) remain until the job is expected or supposed to be completed, (ii) a technician named "Sue" is working on a 2011 "XTerra" of a customer named "Steve" and 12:13 remain until the job is expected or supposed to be completed, (iii) a technician named "Sally" is working on a 2013 "Explorer" of a customer named "Binns" and 5:51 remain until the job is expected or supposed to be completed, and (iv) a technician named "Jeff" is working on a 2013 "F150" of a customer named "Debbie" and 33:51 remain until the job is expected or supposed to be completed. In this example, the service facility 112 may currently be operating four active work stations with individually assigned technicians. Additionally, other information may be displayed as well to improve the customer experience such as a photo of the technician and/or technician qualifications, a job type being performed by a technician on the customer's item (e.g., gas works, diesel works, tires, etc.).

The second portion 604 of the example GUI 600 displays the waiting jobs. A first job for Stephanie's 2012 "Camry" is estimated to start at 9:15 AM, a second waiting job for Tim's 2010 "Impala" is estimated to start at 9:21 AM, and a third job for Ralph's 2011 "Jetta" is estimated to start at 9:35 AM.

Based on the timing information in the first portion 602 of example GUI 600, the current local time may be approximately 9:09 AM (e.g., give or take a minute or two) at least because Sally has a job with a lowest remaining duration of time until completion and Sally is supposed to be finished with Binns' 2013 "Explorer" in approximately six minutes (e.g., 5:51). Accordingly, the timing module 126 has calculated that work on Stephanie's 2012 "Camry" (e.g., the next work order to be drawn from a first-in-first-out queue) is estimated to begin six minutes from the current time of 9:09 AM (i.e., at approximately 9:15 AM) and the job associated with Stephanie's 2012 "Camry" will most likely be drawn by Sally (e.g., assuming she completes her current job on-time or close to on-time). After Sally, Sue is the next technician expected to complete a job, e.g., on Steve's 2011 "XTerra", in approximately twelve minutes (e.g., 12:13).

Accordingly, the timing module 126 has calculated that work on Tim's 2010 "Impala" is estimated to begin twelve minutes from the current time of 9:09 AM (i.e., at approximately 9:21 AM) and the job associated with Tim's 2010 "Impala" will most likely be drawn by Sue (e.g., assuming she completes her current job on-time or close to on-time). After Sue, Jim is the next technician expected to complete a job, e.g., on Lori's 2012 "Escape", in approximately twenty-six minutes (e.g., 25:47). Accordingly, the timing module 126 has calculated that work on Ralph's 2011 "Jetta" is estimated to begin twenty-six minutes from the current time of 9:09 AM (i.e., at approximately 9:35 AM) and the job associated with Ralph's 2011 "Jetta" will most likely be drawn by Jim (e.g., assuming he completes his current job on-time or close to on-time).

Finally, if there are no other jobs waiting besides the three shown (e.g., the automobiles for Stephanie, Tim and Ralph), the timing module 126 may calculate the estimated next available start time 606 based on the estimated duration of time remaining for Jeff to complete work on Debbie's 2013 "F150" (e.g., approximately thirty-four minutes or 33:51). Accordingly, the estimated next available start time 606 would be thirty-four minutes after 9:09 AM, or 9:43 AM.

In various embodiments, a first service facility may also display a next available start time of one or more other service facilities. For instance, if the first service facility currently has a long estimated wait (e.g., the next available start time is more than an hour from the current time), the first service facility may access and display timing information from other service facilities that may have a shorter estimated wait (e.g., no wait, fifteen minutes, thirty minutes, etc.). The access and display of the timing information from other service facilities may be based on geographical information (e.g., the other service facilities are in the same zip code or in the same city as the first service facility) or a threshold distance (e.g., the other service facilities are within ten or twenty miles of the first service facility). In this scenario, a customer may be more likely to visit another service facility if it is close.

As seen from the examples provided above, to calculate the timing information, the timing module 126 uses (i) job status information (e.g., an actual start time of a job) received from a technician and/or a work station and (ii) the estimated durations of time to completion for jobs of a particular type. The calculations may be made based on a number of work stations and a number of jobs in the waiting queue. In various implementations where the number of waiting jobs exceeds the number of work stations (e.g., there are six job waiting and four active or operating work stations), the timing module 126 may consider an estimated duration of time to completion of a waiting job to calculate the timing information. For example, a waiting job at the bottom of the queue may have an estimated start time based on an estimated duration of time to completion of a waiting job at the top of the queue (e.g., based on the current timing information, both waiting jobs may be drawn by the same technician).

In various embodiments, the timing module 126 may consider an additional set amount of time (e.g., one minute, two minutes, five minutes) it typically takes for a technician and/or work station to transition between jobs (e.g., move a completed item out of a work station, move a new item to be serviced into the work station, etc.). This amount of time may be referred to as a "buffer" or "prepare" time and may be factored in to the determination/calculation of the timing estimates. In various embodiments, the buffer or prepare time may be part of, or included, in the estimated duration of time to completion (e.g., 208(1) . . . 208(M)).

In some instances where a started job is not completed when expected (e.g., the job takes longer than it is supposed to), the timing module 126 may update the timing information. For example, continuing the example in FIG. 6, if Sally is delayed by more than six minutes for an unforeseen reason and Sue finishes work on Steve's 2011 "XTerra" before Sally finishes work on Binns' 2013 "Explorer", then Stephanie's 2012 Camry may be drawn by Sue instead of Sally. At this time, the estimated start times may be updated to reflect that Sally is delayed by more than six minutes.

Accordingly, the output module 128 is configured to access or stream the timing information calculated by the timing module 126 and cause the timing information to be displayed (e.g., a live count-down, real-time updates). Consequently, a customer 106 such as Lori can see the estimated duration of time until service on her 2012 Escape is expected to be completed (e.g., a count-down from 25:47→25:46→25:45→25:44 and so forth).

Figure 7:
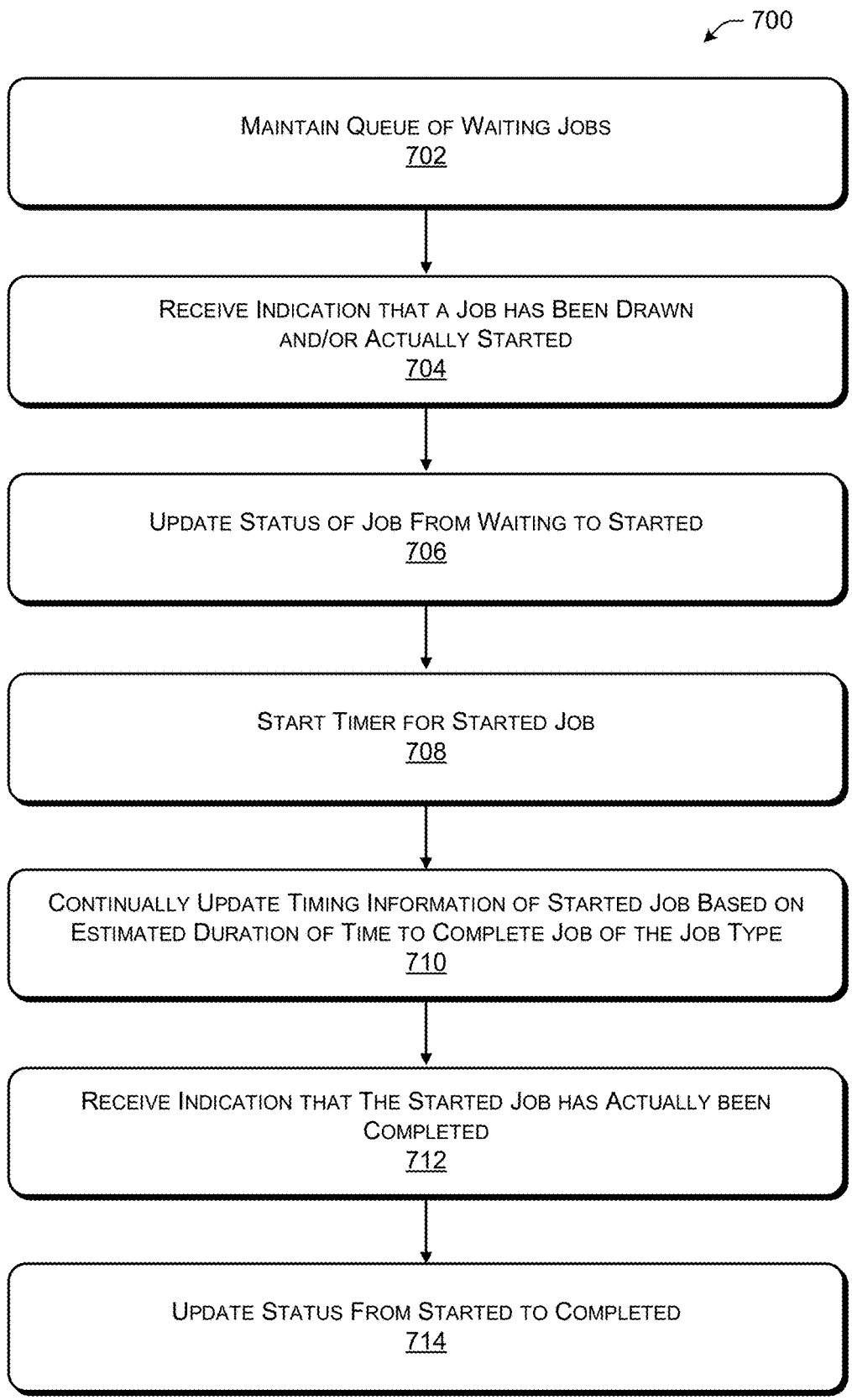
FIG. 7 is a flow diagram showing an example process that changes the status of a job based on job status information, as described herein in accordance with various embodiments.

FIG. 7 describes an example process 700 that changes the status of a job based on job status information. In various embodiments, individual operations described with respect to FIG. 4 may be performed by various ones of the devices discussed with respect to FIGS. 1 and 2.

At 702, the scheduling module 124 maintains a queue of jobs with a "waiting" status (e.g., the waiting jobs 210).

At 704, the scheduling module 124 receives (i) an indication that a technician and/or a work station is available and has drawn a job from the queue of waiting jobs and/or (ii) an indication that work on the job has actually been started.

At 706, the scheduling module 124 updates the status of the job from a "waiting" or "ready" status to a "started" status.

At 708, the timing module 126 may start a timer for the started job upon receiving the indication that work on the job has actually been started. For example, the timing module 126 may set the timer in accordance with an estimated duration of time to completion (e.g., one of 208(1) . . . 208(M)) based on a job type (e.g., one of 206(1) . . . 206(M)) of the job so that a count-down can commence. For instance, if the estimated duration of time to completion is forty-five minutes, then the timing module 126 may start a forty-five minute timer upon receiving the indication that work on the job has actually been started.

At 710, the timing module 126 or the timer may continually update the timing information based on the estimated duration of time to complete the job of a particular type. For example, the timer may provide a live count-down conveying the estimated time remaining until completion and the output module 128 may communicate or display the live count-down for the job being processed. In one example scenario, if five minutes have elapsed since receiving the indication of an actual start time and the estimated duration of time to complete the job is forty-five minutes, then the timing information communicated or displayed will indicate that an estimated forty minutes remain until the job is supposed to be completed. Accordingly, the customer 106 is able to view an updated and accurate estimate of how much time remains until expected completion of the job and/or an accurate estimate of an expected completion time.

At 712, the scheduling module 124 receives an indication that work on the job has actually been completed.

At 714, the scheduling module 124 updates the status of the job from a "started" status to a "completed" status.

In various embodiments, the timing module 126 may calculate, based on the actual start time (e.g., 9:30 AM) and the actual end time (e.g., 10:10 AM), an actual duration of time to complete the job (e.g., forty minutes) and store the actual duration of time to complete the job in the job timing information database 134 so that it can be accessed and used to generate performance reports, as further discussed herein.

Figure 8:
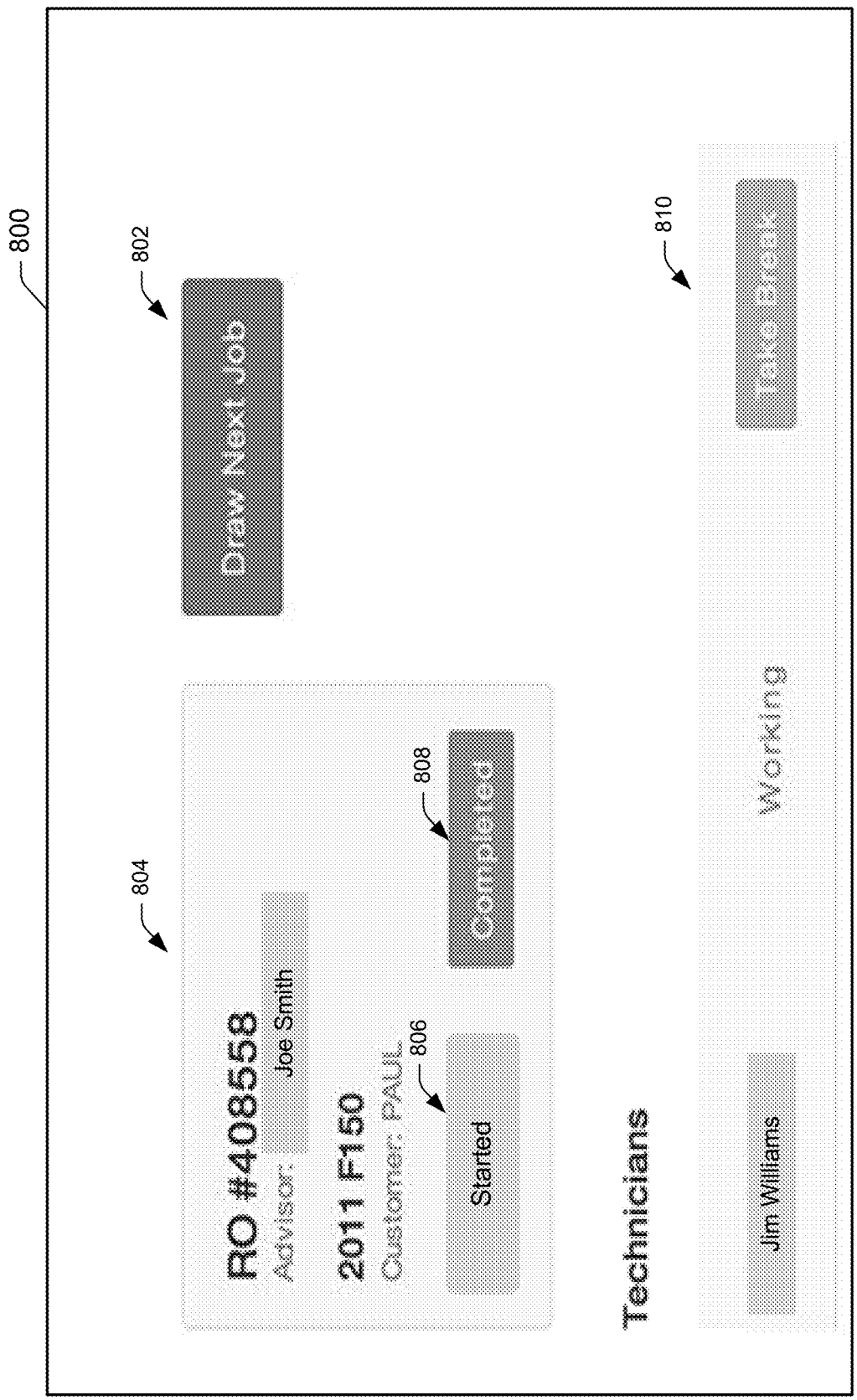
FIG. 8 illustrates an example graphical user interface directed to receiving job status indications from technicians operating the work stations, as described herein in accordance with various embodiments.

FIG. 8 illustrates an example GUI 800 directed to receiving job status indications from technicians operating the work stations 114(1) . . . 114(N). For example, a technician (e.g., "Jim Williams" in FIG. 8) may view the example GUI 800 via a work station device 116 to provide indications such as those discussed above with respect to the example process 700 of FIG. 7. The technician may visit the work station device 116 after completing a previous job, and thus, the technician and the work station are available to work on another job from the queue of waiting jobs 210. In another example, the technician may view the example GUI 800 at the entity device 104 and provide input at the entity device 104.

The example GUI 800 displays a "draw next job" option 802. In response to selecting the draw next job option 802, an indication is sent to the entity device 104 so that another job can be pulled from the queue of waiting jobs 210 and/or assigned to the technician and his/her work station. The example GUI 800 may display a portion of information 804 that corresponds to the drawn job (e.g., a work order number or a RO number, a customer name, a vehicle year and model, a job type, etc.), which was created by a specific advisor (e.g., "Joe Smith"). The portion of information 804 includes a "started" option 806 which a technician selects so that an indication of an actual start time is communicated to the entity device 104 when the technician starts the job. The portion of information 804 further includes a "completed" option 808 which the technician selects so that an indication of an actual complete time is communicated to the entity device 104 when the technician finishes the job.

In various embodiments, the technicians may also be provided with a "take break" option 810. The take break option 810 allows the technicians to take their work breaks (e.g., 15 minutes in the morning, 30 or 60 minute lunch, 15 minutes in the afternoon). Accordingly, the work breaks may be associated with a pre-defined amount of break time. The timing module 126 may further be configured to calculate, or update, the timing information in light of a work break taken by a technician (e.g., a scheduled or known work break or an indication of work break).

Figure 9:
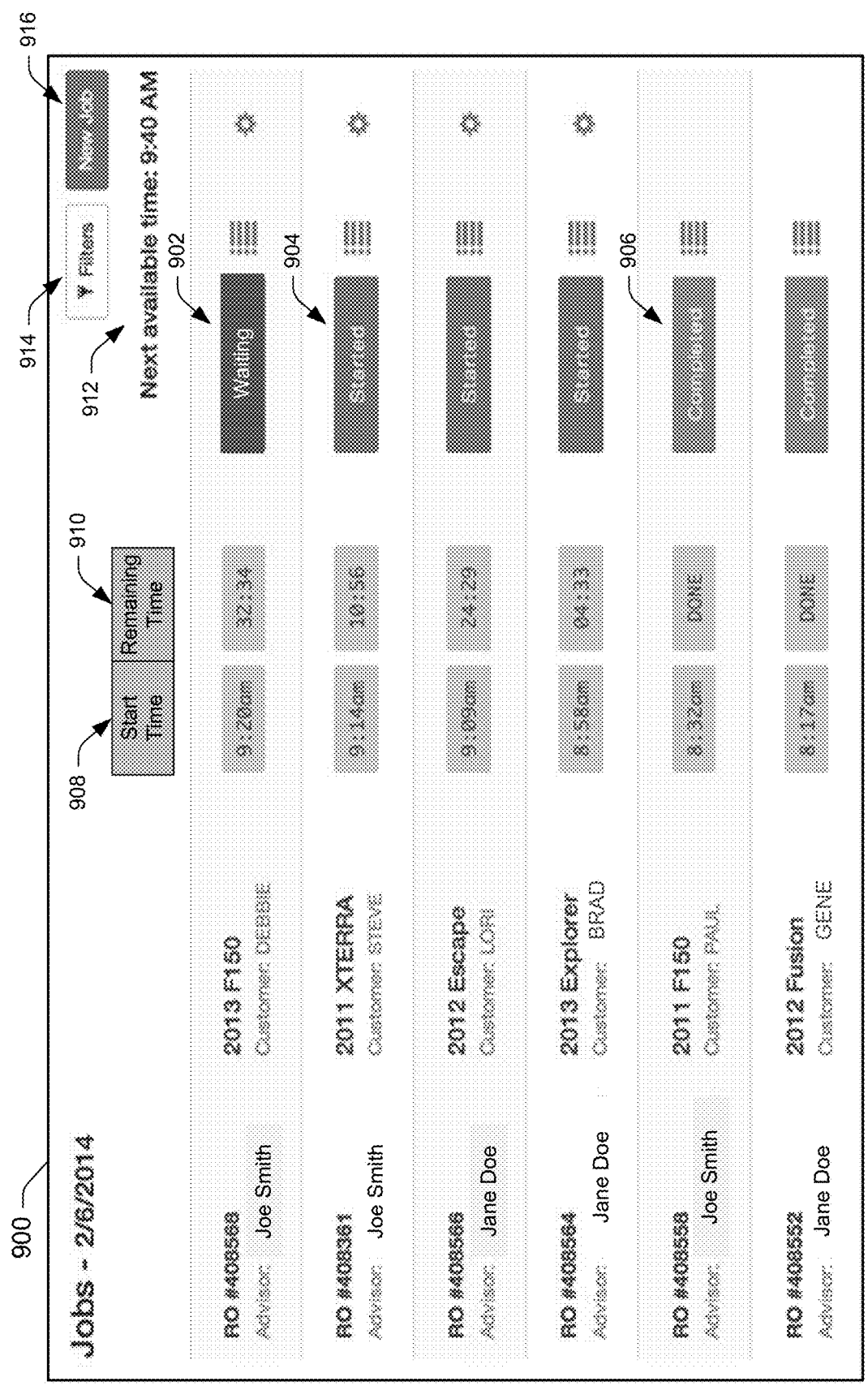
FIG. 9 illustrates an example user interface directed to displaying the status of jobs to a manager or advisor of a service facility, as described herein in accordance with various embodiments.

FIG. 9 illustrates an example GUI 900 directed to displaying the status of jobs to a representative 204 (e.g., manager, a supervisor, advisor, receptionist, etc.) of a service facility 112. The example GUI 900 lists the jobs that have come through one or more service facilities during a given period (e.g., a day such as "2/6/2014" in FIG. 9). The jobs listed may include information associated with the job such as the customer information (e.g., customer name), the item information (e.g., year and model of an automobile), and service facility information (e.g., an advisor that created the repair order and an assigned repair order number). As discussed above, each job listed may also be associated with a status such as "waiting" 902, "started" 904, and "completed" 906, which may also be displayed. Different colors may visually distinguish one status from another (e.g., waiting jobs may be highlighted yellow, started jobs may be highlighted green, etc.).

The example GUI 900 also shows a start time 908 for each job listed (e.g., an estimated start time for waiting jobs and an actual start time for started or completed jobs), the estimated duration of time remaining until completion 910 for each started job listed, and the estimated next available start time 912. Accordingly, the representative 204 may access the example GUI 900 to view an operational "snapshot" of the service facility at a particular point in time. In various embodiments, a filter option 914 allows the jobs to be sorted and viewed based on status (e.g., the waiting jobs, the started jobs or the completed jobs), by type of jobs (e.g., the jobs of the works gas type, the jobs of the works diesel type, etc.), by advisor, by service facility, etc. Moreover, the representative 204 may select a new job option 916 so that a new job can be created, e.g., via example GUI 500.

Figure 10:
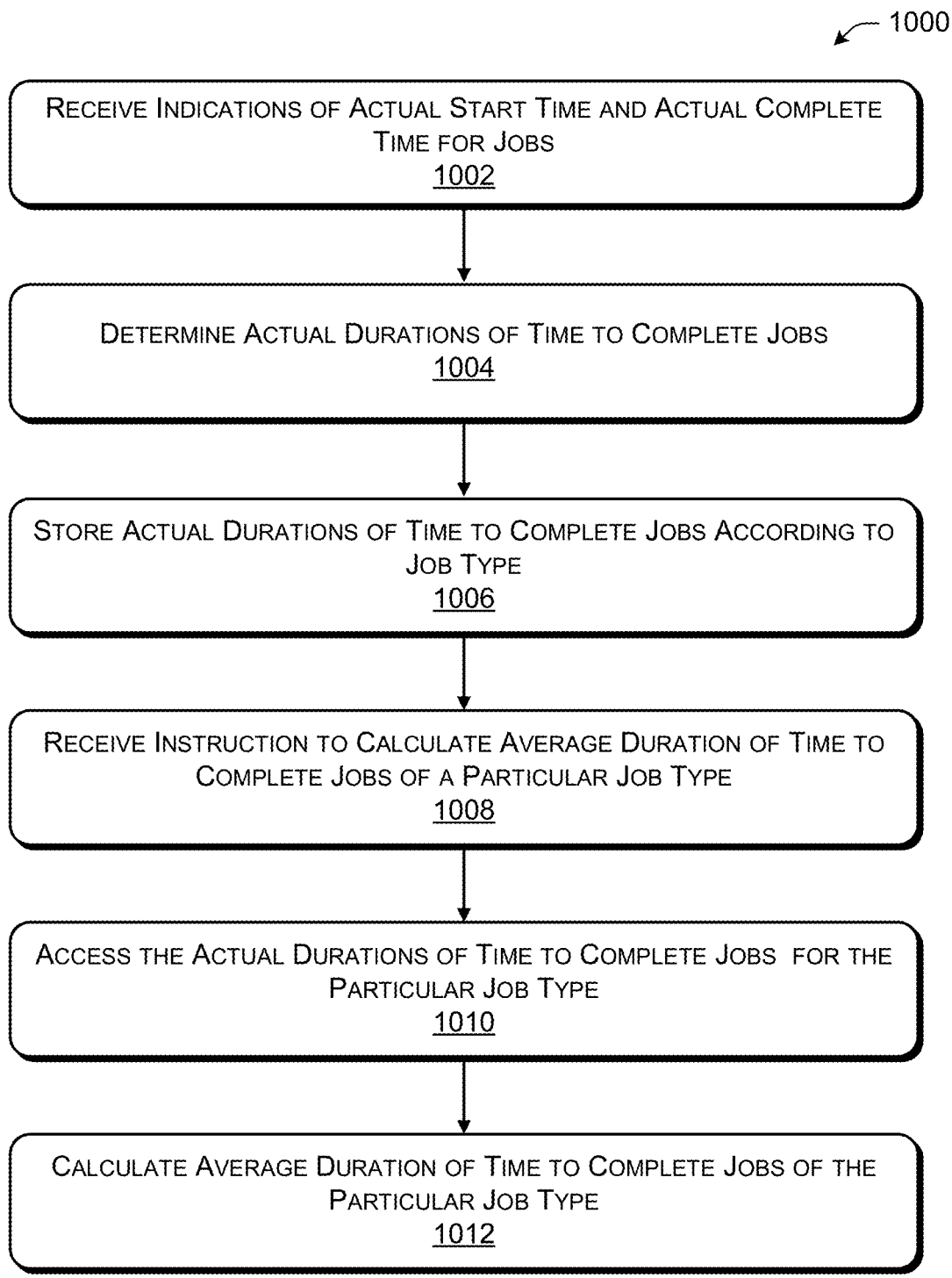
FIG. 10 is a flow diagram showing an example process that determines actual durations of times it takes to complete jobs to determine an average duration for jobs of a particular job type, as described herein in accordance with various embodiments.

FIG. 10 describes an example process 1000 that determines actual durations of times it takes to complete jobs to calculate an average duration for jobs of a particular job type. In various embodiments, individual operations described with respect to FIG. 10 may be performed by various ones of the devices discussed with respect to FIGS. 1 and 2.

At 1002, the scheduling module 124 receives indications of an actual start time and an actual complete time for each job of a plurality of jobs completed at an individual service facility or across multiple service facilities.

At 1004, the timing module 126 may determine, based on the actual start time and the actual complete time, an actual duration of time to complete each job. For example, if the actual start time is 9:30 AM and the actual complete time is 10:15 AM, then the actual duration of time to complete the job would be forty-five minutes.

At 1004, the timing module 126 stores the actual duration of time to complete each job in the job timing information database 134. In various embodiments, the actual durations of time to complete jobs may be stored according to job type (e.g., 206(1) . . . 206(M)). The actual durations of time to complete job may also be stored according to a technician, a work station, and/or a service facility. Thus, the job timing information database 134 may include multiple job entries, where each job entry may identify a work or repair order (e.g., the information in FIG. 5), a job type, an estimated duration of time to completion, a technician, a service facility, an actual start time, an actual complete time, and an actual duration of time to complete the job.

At 1008, the works-flow timing service 102 receives an instruction to calculate an average duration of time to complete jobs of a particular job type. For example, the instruction may be a pre-set or pre-configured instruction to make the calculation periodically (e.g., at the end of each work day, at the end of each work week, at the start of a new month, etc.). In another example, the instruction may be initiated, and provided, by a representative 204 (e.g., a manager or a supervisor). In various embodiments, the instruction may indicate whether to consider or sample jobs from an individual service facility or multiple service facilities.

At 1010, the timing module 126 access, via the job timing information database 134, the actual durations of time to complete the jobs of the particular job type. For example, there may be one hundred durations based on one hundred jobs of the job type completed at a particular service facility over the last five days. In another example, there may be a thousand durations based on one thousand jobs of the job type completed at multiple service facilities over the last five days.

At 1012, the timing module 126 calculates the average duration of time to complete the jobs of the particular type. For instance, the timing module 126 may add up the various durations of time and divide by a number of actually completed jobs to calculate the average duration of time to complete the jobs of the particular type.

In various embodiments, the works-flow timing service 102 uses the average time calculated as the estimated duration of time to completion (e.g., one of 208(1) . . . 208(M)) associated with the particular job type (e.g., one of 206(1) . . . 206(M)).

Figure 11:
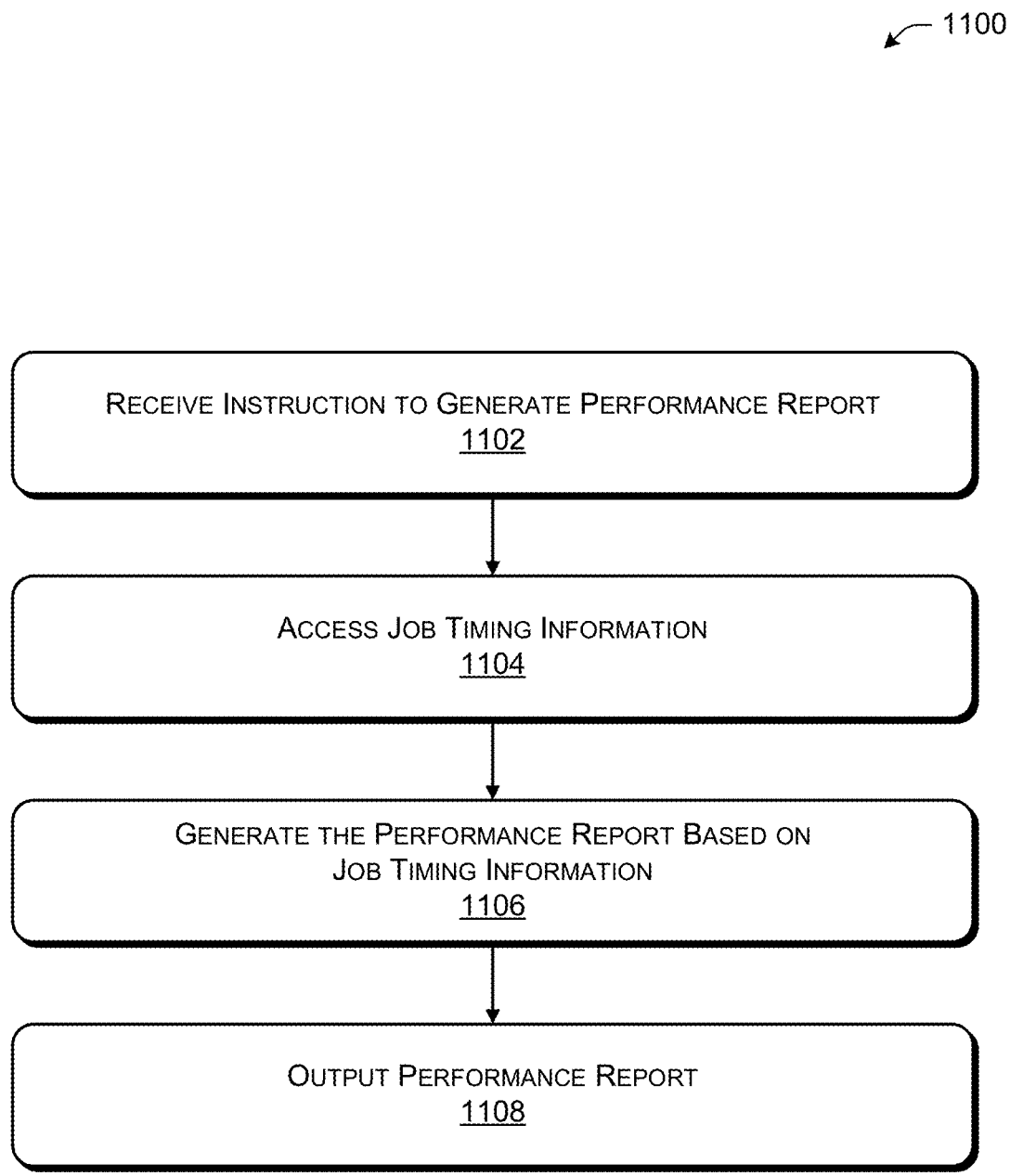
FIG. 11 is a flow diagram showing an example process that generates performance reports based on actual timing information associated with actually completed jobs, as described herein in accordance with various embodiments.

FIG. 11 describes an example process 1100 that generates performance reports based on actual timing information associated with completed jobs. In various embodiments, individual operations described with respect to FIG. 11 may be performed by various ones of the devices discussed with respect to FIGS. 1 and 2.

At 1102, the performance module 130 receives an instruction to generate a performance report based on actual timing information associated with jobs. For example, a supervisor or manager may desire to view a performance report for a group of technicians at the end of a work day. In another example, a supervisor or manager may desire to view a performance report for a specific service facility at the end of a work week.

At 1104, the performance module 130 accesses the job timing information stored in the job timing information database 134. For example, the performance module may access, for jobs completed in a given period (e.g., two hours, four hours, a day, a week, a month), one or more of an actual start time, an actual complete time, an actual duration of time to complete a job (e.g., determined in operation 1004 of FIG. 10). Moreover, the performance module 130 may access other information associated with a job such as the technician that performed the job, the type of the job, etc.

At 1106, the performance module 130 generates the performance report requested based on the job timing information accessed. In various embodiments, the performance module 130 may generate the reports based on a comparison of estimated timing information for jobs (e.g., the timing information communicated to customers at a time a job work order is created) and actual timing information associated with the actual completion of the jobs. For example, the performance module 130 may determine a difference between an estimated time (e.g., an estimated start time communicated to a customer) and an actual time (e.g., the actual start time). Moreover, the performance module 130 may aggregate the differences that result for the comparisons of multiple jobs to generate the performance results. In some instances, the differences may be compared to thresholds to determine whether job performance is timely, as further discussed herein. Example performance reports are discussed herein with respect to the example GUIs shown in FIGS. 12-18.

At 1108, the performance module 130 outputs or displays the performance report generated. As discussed above, a manager or supervisor may view the performance report to evaluate a technician or a service facility or to compare technicians or service facilities. In various embodiments, the performance module 130 may store generated performance reports for future use or later access. The performance module 130 may also communicate the performance reports to another device.

Figure 12:
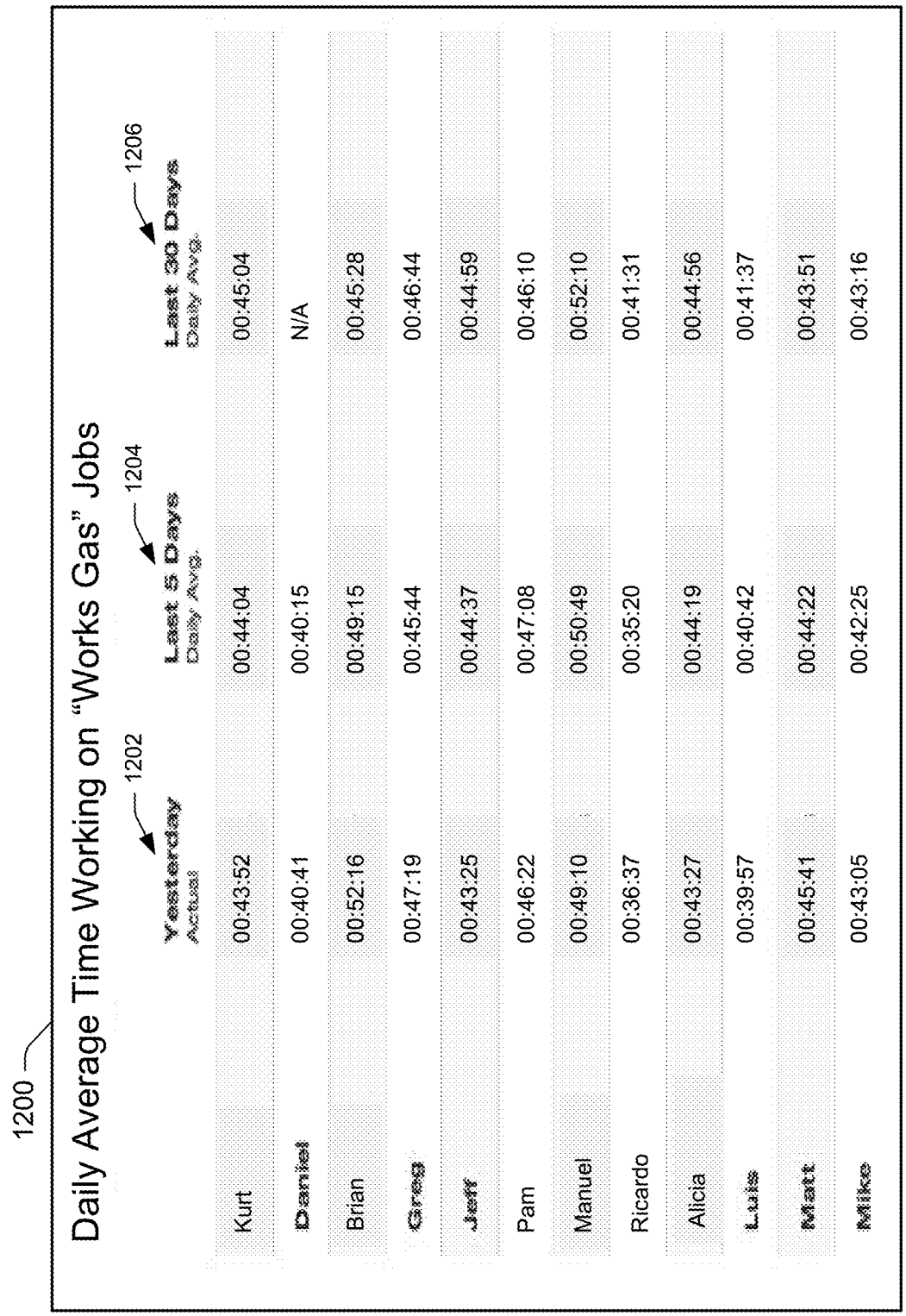
FIG. 12 illustrates an example graphical user interface directed to displaying an average duration of time it takes for individual technicians to complete jobs of a particular type, as described herein in accordance with various embodiments.

FIG. 12 illustrates an example GUI 1200 directed to displaying an average duration of time it takes for individual technicians to complete jobs of a particular type. The performance module 130 may generate the report of FIG. 12 in response to receiving an instruction, e.g., from a manager or advisor, to view technician specific averages for a particular job type (e.g., "works gas" in FIG. 12). The technicians are listed on the left, e.g., "Kurt", "Daniel", "Brian", "Greg" and so forth, and may be technicians that work at an individual service facility or across multiple service facilities.

The performance module 130 may determine the numbers shown in FIG. 12 by accessing, for each technician, the actual durations of time to complete job of the particular type (e.g., "works gas") over a defined period (e.g., yesterday 1202, last five days 1204, and last thirty days 1206) and calculate the average for the defined period. As discussed above, the actual durations of time to complete a job may be stored according to a technician (e.g., technician identifier associated with a job entry) and a job type. The defined periods in FIG. 12 (e.g., yesterday 1202, last five days 1204, and last thirty days 1206), as well as FIGS. 13-18, are shown as examples only, and therefore, may be other default or user-defined time periods as well (e.g., a two hour period, a four hour period, a selected week, a selected month, etc.).

Accordingly, using the performance report displayed in the example GUI 1200, a manager or supervisor can evaluate the performance of an individual technician or compare technicians. For example, one could conclude Kurt has shown improvement over the thirty days since his daily average for the last five days is lower than the daily average for the last thirty days (e.g., Kurt may be a new employee and the manager may want to see improvement in Kurt's timeliness based on a job learning curve). In another example, one could conclude that Brian has not recently been efficient as he usually is since his daily average for the last five days is higher than his daily average for the last thirty days.

In various embodiments, the report module 130 may be configured to emphasize (e.g., highlight, bold, distinguish by color), or in some way notify a viewer of, any outlying numbers or averages that exceed a range or threshold of acceptable or expected numbers or averages. For example, it may not be possible, no matter how experienced or efficient a technician may be, for a "works gas" job to be completed in under thirty-eight minutes. Thus, Ricardo's displayed averages of (00:36:37) and (00:35:20) may signal that Ricardo may be skipping a work item on a checklist for jobs of the "works gas" type. Accordingly, the manager or supervisor may follow-up with Ricardo regarding his unusual averages and make sure he is performing the jobs appropriately.

Figure 13:
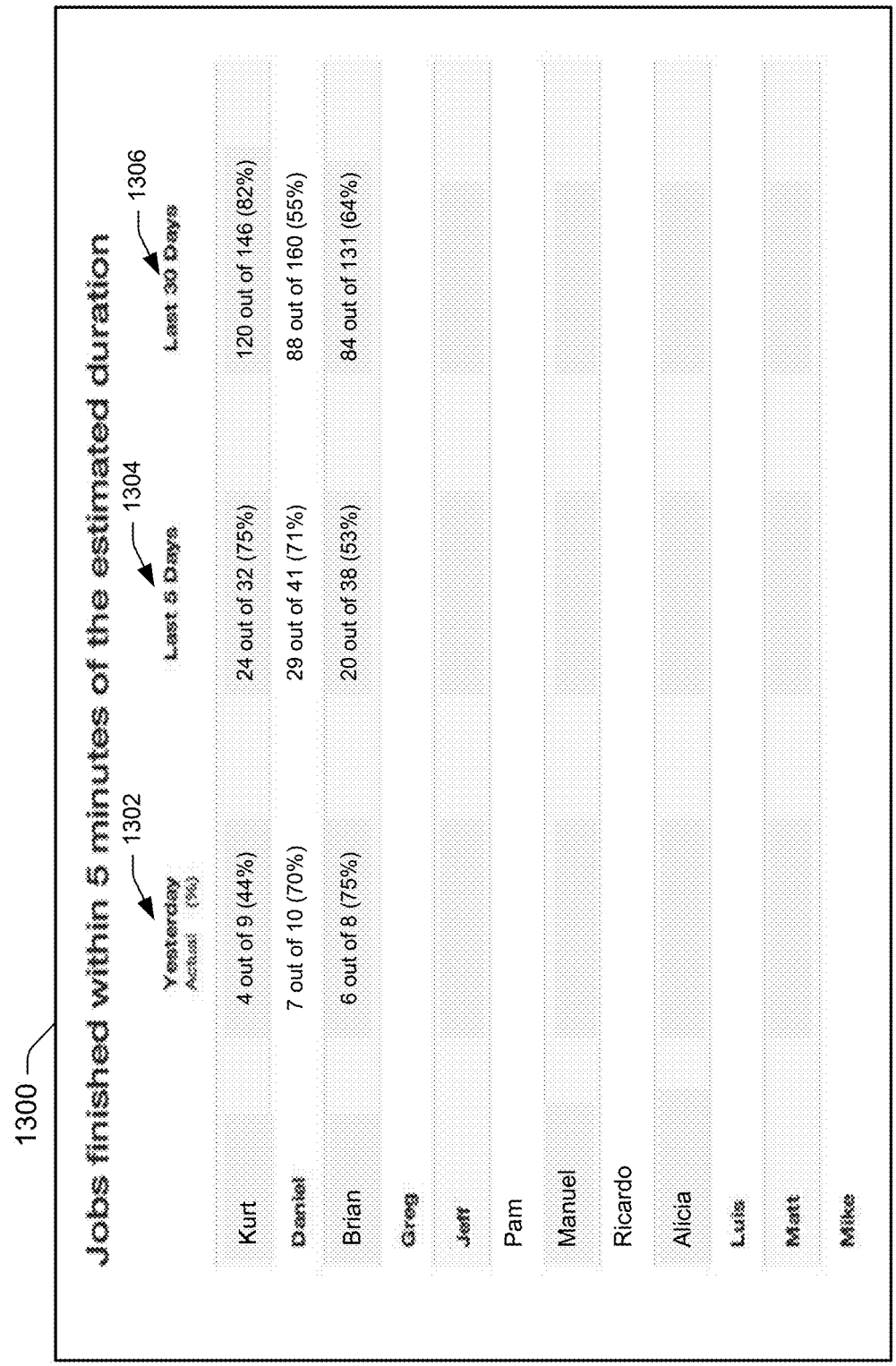
FIG. 13 illustrates an example graphical user interface directed to displaying a number and percentage of jobs actually completed within a threshold period of time of an estimated duration of time to completion, as described herein in accordance with various embodiments.

FIG. 13 illustrates an example GUI 1300 directed to displaying a number and percentage of jobs actually completed within a threshold period of time of an estimated duration of time to completion. For example, if the estimated duration of time to completion is thirty minutes and the threshold period of time is five minutes, a job completed in thirty-five minutes or less qualifies as a timely job. In contrast, a job completed in thirty-five minutes and one second or more does not qualify as a timely job. In FIG. 13, the threshold period of times is five minutes and the report is generated for given periods similar to those displayed in FIG. 12 (e.g., yesterday 1302, the last five days 1304, the last thirty days 1306).

The performance module 130 may generate the report of FIG. 13 in response to receiving an instruction, e.g., from a manager or advisor, to view technician specific numbers associated with job completion timeliness (e.g., jobs of various types, jobs of a specific type). Again, the technicians are listed on the left, e.g., "Kurt", "Daniel", "Brian", "Greg" and so forth.

The performance module 130 may determine the numbers shown in FIG. 13 by accessing, for each technician, (i) a number of jobs completed over the given period, and (ii) the actual durations of time to complete the jobs. In particular, the performance module 130 compares an actual duration of time to complete a job of a particular job type (e.g., "works gas"), for an individual technician, with an estimated duration of time to complete (e.g., forty-five minutes) the job of the particular type, which may be a performance expectation for the technicians. The performance module 130 may then determine, based on the comparison, if the technician actually completed the job within the threshold period of time (e.g., five minutes) after the estimated duration of time expires. In many instances, the threshold discussed in this paragraph may not be applicable to jobs actually completed more than five minutes before the estimated duration of time expires (e.g., because this indicates efficient and timely performance that exceeds expectations). As discussed above, the actual durations of time to complete a job may be stored according to a technician and a job type.

Using the performance report displayed in the example GUI 1300, a manager or supervisor can evaluate the performance of an individual technician with respect to timeliness, or compare technicians with respect to timeliness. The manager or supervisor may then follow up with a technician associated with low percentages indicating the technician is struggling to finish jobs on time or within the threshold period of time.

In some implementations, the report module 130 may calculate and display a daily average instead of the total numbers, e.g., for the last five days and the last thirty days. Moreover, the number and averages displayed may include decimals.

Figure 14:
FIG. 14 illustrates an example graphical user interface directed to displaying a number of jobs actually completed by a technician for a given period, as described herein in accordance with various embodiments.

FIG. 14 illustrates an example GUI 1400 directed to displaying a number of jobs actually completed by a technician for a given period. The performance module 130 may generate the report of FIG. 14 in response to receiving an instruction, e.g., from a manager or advisor, to view how many jobs a technician has completed for the defined periods. In various embodiments, the number of jobs completed may correspond to various types or an individual job type.

In some implementations, the report module 130 may calculate and display a daily average number of jobs instead of the total numbers, e.g., for the last five days and the last thirty days.

Figure 15:
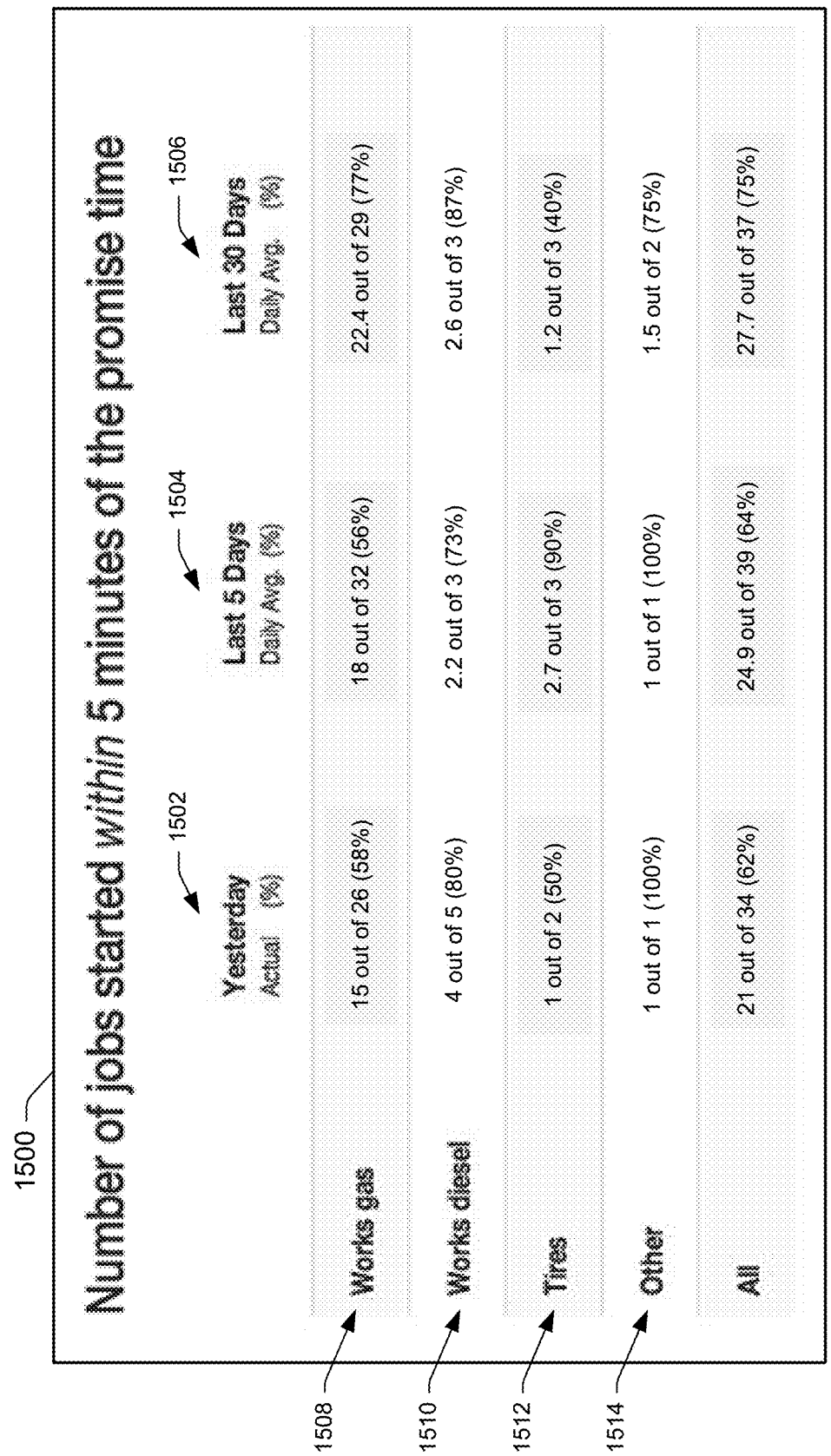
FIG. 15 illustrates an example graphical user interface directed to displaying a number and percentage of jobs actually started within a threshold period of time of an estimated start time, as described herein in accordance with various embodiments.

FIG. 15 illustrates an example GUI 1500 directed to displaying a number and percentage of jobs actually started within a threshold period of time of an estimated start time. In FIG. 15, the threshold period of times is five minutes and the report is generated for given periods similar to those displayed in FIG. 12 (e.g., yesterday 1502, the last five days 1504, the last thirty days 1506).

The performance module 130 may generate the report of FIG. 15 in response to receiving an instruction, e.g., from a manager or advisor, to view job type specific numbers associated with job start timeliness.

The performance module 130 may determine the numbers shown in FIG. 15 by accessing information for completed jobs of a specific job type (e.g., works gas 1508, works diesel 1510, tires 1512, and other 514). In particular, the performance module 130 is configured to access the actual start time of a job and to compare the actual start time to an estimated start time that may be stored in association with the work order at a time when the work order was created. Based on the comparison, the performance module 130 may determine if the job was actually started before or within a threshold period of time after the original estimated start time (e.g., determine that the job starts before the estimated start time or within five minutes of the estimated start time).

Thus, the performance module 130 can determine whether a service facility is meeting customer expectations by starting jobs on-time or close to on-time. The customer expectations may be realized because the estimated start times may be communicated to the customers when the job and the work order are created.

Thus, using the performance report displayed in the example GUI 1500, a manager or supervisor can evaluate the performance of an individual service facility or multiple service facilities and compare the performance of service facilities and the performance with respect to different job types. The performance report displayed in the example GUI 1500 may also be generated for technicians.

FIG. 16 illustrates an example GUI 1600 directed to displaying a number and percentage of jobs actually finished before or within a threshold period of time after an estimated duration of time expires. In this example, the numbers are displayed according to job type. Moreover, this example report may be generated for an individual technician, multiple technicians, an individual service facility, or multiple service facilities.

FIG. 17 illustrates an example graphical user interface 1700 directed to displaying a performance report that summarizes a number of actual completed jobs per day according to work type. This example report may be generated for an individual technician, multiple technicians, an individual service facility, or multiple service facilities.

FIG. 18 illustrates an example graphical user interface 1800 directed to displaying a performance report that determines and displays average differences (e.g., the +/− in FIG. 18) between an estimated duration of time to complete a job of a particular type and an actual duration of time to complete a job of the particular type. The performance report shown in FIG. 18 allows a manager or supervisor to view a particular area of work (e.g., by job type) that is timely and efficient or that is not timely and inefficient (e.g., the works gas job type has a thirty day average of being late by 5.68 minutes compared to 9.40 minutes for the tires job type). The report determined and displayed in FIG. 18 may be generated for an individual technician, an individual service facility, or multiple service facilities.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method for notifying customers of real-time timing information associated with servicing of automobiles in an automobile maintenance service facility implementing a no-appointment-necessary policy, the method comprising:
continuously receiving over a period of time, by a server and from a plurality of work station devices connected to the server via one or more network connections, first timing information for a plurality of first automobile maintenance service jobs, wherein:
the plurality of first automobile maintenance service jobs are ones that have already been started and that are currently being performed at a plurality of work stations equipped to service the automobiles within the automobile maintenance service facility, the first timing information includes an estimated amount of time until a respective first automobile maintenance service job is completed, and an individual work station of the plurality of work stations is associated with a corresponding work station device of the plurality of work station devices and the individual work station includes one or more automobile maintenance service technicians tasked with performing the respective first automobile maintenance service job;

continuously accessing, by the server and over the period of time, second timing information for a plurality of second automobile maintenance service jobs, wherein:

the plurality of second automobile maintenance service jobs are ones that have been placed in a maintenance service queue and that are waiting to be started at the automobile maintenance service facility, the second timing information includes an estimated duration of time to complete a respective second automobile maintenance service job based at least in part on an automobile maintenance service job type, and the estimated duration of time to complete the respective second automobile maintenance service job is calculated based on averaging, for a predefined recent time period, actual durations of time taken to complete previously completed automobile maintenance service jobs of the automobile maintenance service job type;

dynamically determining, by the server in real-time based at least in part on the first timing information continuously received over the period of time and the second timing information continuously accessed over the period of time, estimated starting times for the plurality of second automobile maintenance service jobs that have been placed in the maintenance service queue and that are waiting to be started at the automobile maintenance service facility;

dynamically determining, by the server in real-time based at least in part on the first timing information continuously received over the period of time and the second timing information continuously accessed over the period of time, a predicted earliest next available starting time for a next automobile maintenance service job to be added to the plurality of second automobile maintenance service jobs that have been placed in the maintenance service queue and that are waiting to be started at the automobile maintenance service facility, wherein the next automobile maintenance service job is made available for any one of a plurality of next customers that decides to bring an automobile to the automobile maintenance service facility;

automatically generating, by the server, at least one graphical user interface that captures a real-time customer view into an operational timeliness of the automobile maintenance service facility at a particular point in time, the at least one graphical user interface presenting as part of the real-time customer view:

the estimated amount of time until the respective first automobile maintenance service job that has already been started and that is currently being performed at one of the plurality of work stations is completed, which is configured for display in association with a first customer that currently has an automobile being serviced at the automobile maintenance service facility;

the estimated starting times dynamically determined for the plurality of second automobile maintenance service jobs, which are individually configured for display in association with a second customer that has an automobile in the maintenance service queue waiting to be serviced at the automobile maintenance service facility; and the predicted earliest next available starting time dynamically determined for the next automobile maintenance service job, which is configured for display in association with the any one of the plurality of next customers that decides to bring an automobile to the automobile maintenance service facility;

enabling, by the server and for a customer device, network access to the at least one graphical user interface via a uniform resource locator, thereby allowing the first customer, the second customer, and the any one of the plurality of next customers associated with the customer device to view a real-time status update associated with a time when an automobile maintenance service job for the first customer, the second customer, and the any one of the plurality of next customers is to be completed at the automobile maintenance service facility or is to be started at the automobile maintenance service facility; and pushing, by the server and to the customer device, a social network notification of the real-time status update associated with the time when the automobile maintenance service job for the first customer, the second customer, and the any one of the plurality of next customers is to be completed at the automobile maintenance service facility or is to be started at the automobile maintenance service facility.

2. The method of claim 1, further comprising:

receiving service information indicative of the next automobile maintenance service job;

correlating the service information to a pre-defined automobile maintenance service job type;

identifying an estimated time duration to complete the next automobile maintenance service job based at least in part on the pre-defined automobile maintenance service job type;

determining, based at least in part on the estimated time duration, an estimated completion time for the next automobile maintenance service job; and communicating, for the next automobile maintenance service job, the estimated completion time to the customer device.

3. The method of claim 2, wherein the service information comprises a year and a model of the automobile of the next customer, and the pre-defined automobile maintenance service job type is one of a diesel inspection or a gas inspection.

4. The method of claim 1, further comprising:

receiving, from the plurality of work station devices, additional timing information for the plurality of first automobile maintenance service jobs, the additional timing information including updates to the estimated amount of time until the respective first automobile maintenance service job is completed; and dynamically updating, based at least in part on the updates, the estimated amount of time until the respective first automobile maintenance service job is completed.

5. The method of claim 1, further comprising:

receiving, from a work station device, automobile maintenance service job timing information indicating first times when a plurality of automobile maintenance service jobs performed by a particular automobile maintenance service technician were started and second times when the plurality of automobile maintenance service jobs performed by the particular automobile maintenance service technician were completed; and generating, based in part on the first times and the second times, a performance report indicative of timeliness of the particular automobile maintenance service technician with respect to completing the plurality of automobile maintenance service jobs, the timeliness including:

a first number of automobile maintenance service jobs that were started within a threshold period of time of an estimated start time; and a second number of automobile maintenance service jobs that were completed within a threshold period of time of an estimated end time.

6. A system for notifying customers of real-time timing information associated with servicing of automobiles in an automobile maintenance service facility implementing a no-appointment-necessary policy, the system comprising:

one or more processors; and memory storing instructions that, when executed by the one or more processors, configure the system to perform operations comprising:

continuously receiving over a period of time, from a plurality of work station devices connected to the system via one or more network connections, first timing information for a plurality of first automobile maintenance service jobs, wherein:

the plurality of first automobile maintenance service jobs are ones that have already been started and that are currently being performed at a plurality of work stations equipped to service the automobiles within the automobile maintenance service facility, the first timing information includes an estimated amount of time until a respective first automobile maintenance service job is completed, and an individual work station of the plurality of work stations is associated with a corresponding work station device of the plurality of work station devices and the individual work station includes one or more automobile maintenance service technicians tasked with performing the respective first automobile maintenance service job;

continuously accessing, over the period of time, second timing information for a plurality of second automobile maintenance service jobs, wherein:

the plurality of second automobile maintenance service jobs are ones that have been placed in a maintenance service queue and that are waiting to be started at the automobile maintenance service facility, the second timing information includes an estimated duration of time to complete a respective second automobile maintenance service job based at least in part on an automobile maintenance service job type, and the estimated duration of time to complete the respective second automobile maintenance service job is calculated based on averaging, for a predefined recent time period, actual durations of time taken to complete previously completed automobile maintenance service jobs of the automobile maintenance service job type;

dynamically determining, in real-time based at least in part on the first timing information continuously received over the period of time and the second timing information continuously accessed over the period of time, estimated starting times for the plurality of second automobile maintenance service jobs that have been placed in the maintenance service queue and that are waiting to be started at the automobile maintenance service facility;

dynamically determining, in real-time based at least in part on the first timing information continuously received over the period of time and the second timing information continuously accessed over the period of time, a predicted earliest next available starting time for a next automobile maintenance service job to be added to the plurality of second automobile maintenance service jobs that have been placed in the maintenance service queue and that are waiting to be started at the automobile maintenance service facility, wherein the next automobile maintenance service job is made available for any one of a plurality of next customers that decides to bring an automobile to the automobile maintenance service facility;

automatically generating at least one graphical user interface that captures a real-time customer view into an operational timeliness of the automobile maintenance service facility at a particular point in time, the at least one graphical user interface presenting as part of the real-time customer view:

the estimated amount of time until the respective first automobile maintenance service job that has already been started and that is currently being performed at one of the plurality of work stations is completed, which is configured for display in association with a first customer that currently has an automobile being serviced at the automobile maintenance service facility;

the estimated starting times dynamically determined for the plurality of second automobile maintenance service jobs, which are individually configured for display in association with a second customer that has an automobile in the maintenance service queue waiting to be serviced at the automobile maintenance service facility; and the predicted earliest next available starting time dynamically determined for the next automobile maintenance service job, which is configured for display in association with the any one of the plurality of next customers that decides to bring an automobile to the automobile maintenance service facility;

enabling, for a customer device, network access to the at least one graphical user interface via a uniform resource locator, thereby allowing the first customer, the second customer, and the any one of the plurality of next customers associated with the customer device to view a real-time status update associated with a time when an automobile maintenance service job for the first customer, the second customer, and the any one of the plurality of next customers is to be completed at the automobile maintenance service facility or is to be started at the automobile maintenance service facility; and pushing, to the customer device, a social network notification of the real-time status update associated with the time when the automobile maintenance service job for the first customer, the second customer, and the any one of the plurality of next customers is to be completed at the automobile maintenance service facility or is to be started at the automobile maintenance service facility.

7. The system of claim 6, wherein the operations further comprise:
receiving service information indicative of the next automobile maintenance service job;
correlating the service information to a pre-defined automobile maintenance service job type;
identifying an estimated time duration to complete the next automobile maintenance service job based at least in part on the pre-defined automobile maintenance service job type;
determining, based at least in part on the estimated time duration, an estimated completion time for the next automobile maintenance service job; and
communicating, for the next automobile maintenance service job, the estimated completion time to the customer device.

8. The system of claim 7, wherein the service information comprises a year and a model of the automobile of the next customer, and the pre-defined automobile maintenance service job type is one of a diesel inspection or a gas inspection.

9. The system of claim 6, wherein the operations further comprise:
receiving, from the plurality of work station devices, additional timing information for the plurality of first automobile maintenance service jobs, the additional timing information including updates to the estimated amount of time until the respective first automobile maintenance service job is completed; and
dynamically updating, based at least in part on the updates, the estimated amount of time until the respective first automobile maintenance service job is completed.

10. The system of claim 6, wherein the operations further comprise:
receiving, from a work station device, automobile maintenance service job timing information indicating first times when a plurality of automobile maintenance service jobs performed by a particular automobile maintenance service technician were started and second times when the plurality of automobile maintenance service jobs performed by the particular automobile maintenance service technician were completed; and
generating, based in part on the first times and the second times, a performance report indicative of timeliness of the particular automobile maintenance service technician with respect to completing the plurality of automobile maintenance service jobs, the timeliness including:
a first number of automobile maintenance service jobs that were started within a threshold period of time of an estimated start time; and
a second number of automobile maintenance service jobs that were completed within a threshold period of time of an estimated end time.

11. One or more non-transitory computer-readable media storing instructions that, when executed by one or more processors, configure a system to notify customers of real-time timing information associated with servicing of automobiles in an automobile maintenance service facility implementing a no-appointment-necessary policy, the system configured to perform operations comprising:
continuously receiving over a period of time, from a plurality of work station devices connected to the system via one or more network connections, first timing information for a plurality of first automobile maintenance service jobs, wherein:
the plurality of first automobile maintenance service jobs are ones that have already been started and that are currently being performed at a plurality of work stations equipped to service the automobiles within the automobile maintenance service facility,
the first timing information includes an estimated amount of time until a respective first automobile maintenance service job is completed, and
an individual work station of the plurality of work stations is associated with a corresponding work station device of the plurality of work station devices and the individual work station includes one or more automobile maintenance service technicians tasked with performing the respective first automobile maintenance service job;
continuously accessing, over the period of time, second timing information for a plurality of second automobile maintenance service jobs, wherein:
the plurality of second automobile maintenance service jobs are ones that have been placed in a maintenance service queue and that are waiting to be started at the automobile maintenance service facility,
the second timing information includes an estimated duration of time to complete a respective second automobile maintenance service job based at least in part on an automobile maintenance service job type, and
the estimated duration of time to complete the respective second automobile maintenance service job is calculated based on averaging, for a predefined recent time period, actual durations of time taken to complete previously completed automobile maintenance service jobs of the automobile maintenance service job type;
dynamically determining, in real-time based at least in part on the first timing information continuously received over the period of time and the second timing information continuously accessed over the period of time, estimated starting times for the plurality of second automobile maintenance service jobs that have been placed in the maintenance service queue and that are waiting to be started at the automobile maintenance service facility;
dynamically determining, in real-time based at least in part on the first timing information continuously received over the period of time and the second timing information continuously accessed over the period of time, a predicted earliest next available starting time for a next automobile maintenance service job to be added to the plurality of second automobile maintenance service jobs that have been placed in the maintenance service queue and that are waiting to be started at the automobile maintenance service facility, wherein the next automobile maintenance service job is made available for any one of a plurality of next customers that decides to bring an automobile to the automobile maintenance service facility;
automatically generating at least one graphical user interface that captures a real-time customer view into an operational timeliness of the automobile maintenance service facility at a particular point in time, the at least one graphical user interface presenting as part of the real-time customer view:
- the estimated amount of time until the respective first automobile maintenance service job that has already been started and that is currently being performed at one of the plurality of work stations is completed, which is configured for display in association with a first customer that currently has an automobile being serviced at the automobile maintenance service facility;
- the estimated starting times dynamically determined for the plurality of second automobile maintenance service jobs, which are individually configured for display in association with a second customer that has an automobile in the maintenance service queue waiting to be serviced at the automobile maintenance service facility; and
- the predicted earliest next available starting time dynamically determined for the next automobile maintenance service job, which is configured for display in association with the any one of the plurality of next customers that decides to bring an automobile to the automobile maintenance service facility;

enabling, for a customer device, network access to the at least one graphical user interface via a uniform resource locator, thereby allowing the first customer, the second customer, and the any one of the plurality of next customers associated with the customer device to view a real-time status update associated with a time when an automobile maintenance service job for the first customer, the second customer, and the any one of the plurality of next customers is to be completed at the automobile maintenance service facility or is to be started at the automobile maintenance service facility; and pushing, to the customer device, a social network notification of the real-time status update associated with the time when the automobile maintenance service job for the first customer, the second customer, and the any one of the plurality of next customers is to be completed at the automobile maintenance service facility or is to be started at the automobile maintenance service facility.

12. The one or more non-transitory computer-readable media of claim 11, wherein the operations further comprise:
receiving service information indicative of the next automobile maintenance service job;
correlating the service information to a pre-defined automobile maintenance service job type;
identifying an estimated time duration to complete the next automobile maintenance service job based at least in part on the pre-defined automobile maintenance service job type;
determining, based at least in part on the estimated time duration, an estimated completion time for the next automobile maintenance service job; and
communicating, for the next automobile maintenance service job, the estimated completion time to the customer device.

13. The one or more non-transitory computer-readable media of claim 12, wherein the service information comprises a year and a model of the automobile of the next customer, and the pre-defined automobile maintenance service job type is one of a diesel inspection or a gas inspection.

14. The one or more non-transitory computer-readable media of claim 11, wherein the operations further comprise:
receiving, from the plurality of work station devices, additional timing information for the plurality of first automobile maintenance service jobs, the additional timing information including updates to the estimated amount of time until the respective first automobile maintenance service job is completed; and
dynamically updating, based at least in part on the updates, the estimated amount of time until the respective first automobile maintenance service job is completed.

15. The one or more non-transitory computer-readable media of claim 11, wherein the operations further comprise:
receiving, from a work station device, automobile maintenance service job timing information indicating first times when a plurality of automobile maintenance service jobs performed by a particular automobile maintenance service technician were started and second times when the plurality of automobile maintenance service jobs performed by the particular automobile maintenance service technician were completed; and
generating, based in part on the first times and the second times, a performance report indicative of timeliness of the particular automobile maintenance service technician with respect to completing the plurality of automobile maintenance service jobs, the timeliness including:
a first number of automobile maintenance service jobs that were started within a threshold period of time of an estimated start time; and
a second number of automobile maintenance service jobs that were completed within a threshold period of time of an estimated end time.

* * * * *